United States Patent [19]

Mayuzumi et al.

[11] Patent Number: 5,781,191

[45] Date of Patent: Jul. 14, 1998

[54] METHOD AND APPARATUS FOR REPRODUCING OPERATION GUIDANCE INFORMATION, AND METHOD AND APPARATUS FOR REPRODUCING MULTI-MEDIA INFORMATION

[75] Inventors: Tatsuya Mayuzumi; Shinji Kurihara; Syuichi Matsuda; Noriaki Negishi; Tadashi Yoshida, all of Maebashi, Japan

[73] Assignee: Fujitsu Limited, Kawasako, Japan

[21] Appl. No.: 508,109

[22] Filed: Jul. 28, 1995

[30] Foreign Application Priority Data

Nov. 7, 1994 [JP] Japan .................... 6-272743

[51] Int. Cl.⁶ .................................................. G06F 17/00
[52] U.S. Cl. ........................................ 345/336; 395/23
[58] Field of Search ............................ 395/800, 23, 54, 395/20, 77; 345/336, 337, 338

[56] References Cited

U.S. PATENT DOCUMENTS

| | | | |
|---|---|---|---|
| 4,964,077 | 10/1990 | Eisen | 395/337 |
| 5,115,501 | 5/1992 | Kerr | 395/609 |
| 5,204,968 | 4/1993 | Parthasarathi | 395/800 |
| 5,539,869 | 7/1996 | Spoto | 345/336 |
| 5,559,945 | 9/1996 | Beaudet | 395/156 |
| 5,563,805 | 10/1996 | Arbuckle | 345/338 |

*Primary Examiner*—Eric Coleman
*Attorney, Agent, or Firm*—Armstrong, Westerman, Hattori, McLeland, & Naughton

[57] ABSTRACT

An information reproducing method and an apparatus therefor, by which operation guidance information may be automatically used without bothering an operator, includes a reproduction control unit for reading the operation guidance information depending on an event from a database when the event requiring measures taken by the operator occurs in an object apparatus to controllably reproduce the operation guidance information, and a reproducing unit, which is a terminal connected to the object apparatus to be able to manage the object apparatus, for reproducing the operation guidance information and notifying it to the operator. The operation guidance information about measures that should be taken to a condition of the object apparatus changing with a progress of the measures taken by the operator is reproduced at the terminal apparatus. These method and apparatus are applicable to a method and an apparatus used for reproducing various operation guidance information or multi-media information.

13 Claims, 28 Drawing Sheets

FIG. 8

ERROR CODE SETTING SCREEN 42A

| ERROR CODE | TYPE OF ERROR | PART ARRANGEMENT |
|---|---|---|
| 00001 | MECHANISM α NOTE JAM | A → B → C → D → I |
| 00002 | MECHANISM β NOTE JAM | A → B → C → D → I |
| 00003 | MECHANISM γ NOTE JAM | ☐ |
| | | |

PART SELECTION

| A | OPEN DOOR 'A' |
|---|---|
| B | OPEN MECHANISM HOUSING CHAMBER 'B' |

TERMINATE SETTING

F I G. 17
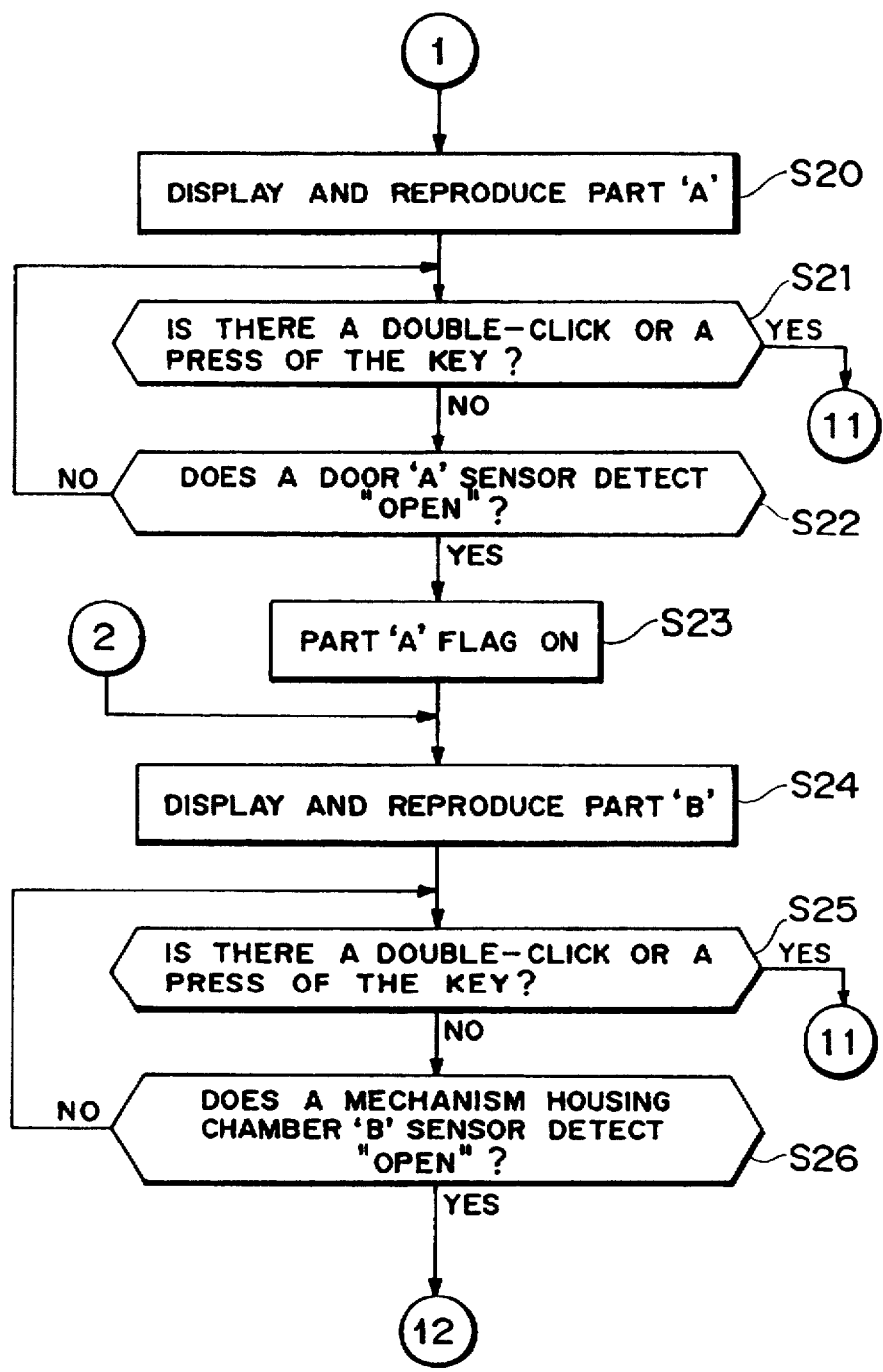

| KEY DATA | CONTROL DATA | IMAGE | SOUND |
|---|---|---|---|
| KEY DATA | CONTROL DATA | IMAGE | SOUND |
| KEY DATA | CONTROL DATA | IMAGE | SOUND |
| KEY DATA | CONTROL DATA | IMAGE | SOUND |
| ⌇ | ⌇ | ⌇ | ⌇ |
| KEY DATA | CONTROL DATA | IMAGE | SOUND |

FIG. 33 (a)
```
WE WILL PRODUCE
YOUR OWN TRAVEL.
 CREATE    PLAY
```

FIG. 33 (b)
```
SELECT A CITY TO
VISIT
   PARIS      LONDON
   MILAN      ROME
   HUMBURG    WIEN
   BRUSSEL

???? ???? ????
```

FIG. 33 (c)
```
SELECT A CITY WHERE
YOR WANT TO VISIT

PARIS ???? ????
```

FIG. 33 (d)
```
SELECT AN AIRLINE
   JAPAN AIRLINE
   SCANDINAVIA AIRLINE
   AIR FRANCE
   ALITALIA
   PARIS ???? ????
```

FIG. 33 (e)
```
SELECT AN AIRLINE
   PARIS
   JAPAN AIRLINE
```

FIG. 33 (f)
```
SELECT THE SIGHTS
   SACRE-COEUR
   MONTMARTRE
   EIFFEL TOWER
   OPERA
   PARIS
   JAPAN AIRLINE
   ????
```

FIG. 33 (g)

SELECT THE SIGHTS
PARIS
JAPAN AIRLINE
EIFFEL TOWER

FIG. 33 (h)

INPUT A FILE NAME
OF A SEQUENCE DATA
■_____
RETAIN

FIG. 33 (i)

WE WILL PRODUCE
YOUR OWN TRAVEL.

CREATE      PLAY

FIG. 33 (j)

SELECT A SEQUENCE DATA

AAA.SQC
BBB.SQC
CCC.SQC

FIG. 33 (k)

PARIS

METHOD AND APPARATUS FOR REPRODUCING OPERATION GUIDANCE INFORMATION, AND METHOD AND APPARATUS FOR REPRODUCING MULTI-MEDIA INFORMATION

BACKGROUND OF THE INVENTION

1) Field of the Invention

The present invention relates to a method and an apparatus for reproducing operation guidance information or multi-media information. In particular, the present invention relates to a method and an apparatus for reproducing operation guidance information depending on an occurring event when the event which needs measures taken by an operator occurs in an object apparatus, and a method and an apparatus for reproducing multi-media information (including the above operation guidance information) including image information and sound information.

2) Description of the Related Art

If any trouble (an error, a necessity of medium supplement, etc.) occurring from a physical cause, which is not bug of a computer, occurs to a main apparatus or a peripheral equipment and there is a necessity for any recovery work by an operator, or the operator (a user) needs an operation guidance with or without a trouble, an operation guidance screen (a help screen) is displayed on a display of the main apparatus or on a display of the peripheral equipment, in general.

In this operation guidance screen, there is shown an explanation by a display of symbols or sentences. The operator treats the main apparatus or the peripheral equipment by referring to this screen. The operator operates an input means such as a keyboard, a mouse, etc. with a progress of the measures taken to the main apparatus or the peripheral equipment, and proceed a display in the operation guidance screen displayed on a display unit.

However, if the operation guide is an explanation or the like by symbols or sentences, the operator has a difficulty in comprehending actual operation.

In order to provide more comprehensible operation guidance, a technique for reproducing operation guidance information (help information) through multi-media using image displays and sound outputs has rapidly spread in recent years. However, a function to display detailed operation guidance information is rarely provided to the individual peripheral equipment such as a printer. For this, it is difficult for the operator to grasp an actual operation.

According to the operation guidance information reproducing technique above-described, the operator needs to operate a keyboard, a mouse or the like to input any instruction every occasion when the operator refers to a guidance of an operation that the operator should perform next with a progress of measures taken to the main apparatus or the peripheral equipment. This is extremely troublesome.

If a number of users use the apparatus, it is desirable to provide help information depending on a level of skill of the user. If basic information is provided to a user in a senior level for a long time, or help information in which a lot of technical terms are used is provided to a user in a beginner level who has no knowledge about the apparatus, the user might be forced an inefficient work.

As means to provide help information in different degrees of difficulty and detail depending on a level of skill of a user, there have been known a technique in which the apparatus judges a level of skill of the user and stores it, a technique in which the user inputs his or her level of skill to the apparatus, or a technique in which a level of skill of individual operator is managed on the basis of a personal ID information such as an operator card.

However, the technique in which the apparatus judges a level of skill of each user and store it in order to provide help information in a level of difficulty and detail meeting a level of the operator has a problem that this technique is applicable to an apparatus which is used by a sole and the same operator any time. If another user tries to use a help function of this apparatus, help information not conforming to a level of this user is reproduced, thus it is hopeless that the user can effectively use a help function.

In relation with the technique where the user inputs his own level of skill into the apparatus, the user needs to specify as to which level the user himself or herself corresponds before watching an actual help information. If the user calls help information of a certain level to which the user considers that a skill of the user corresponds to, but contents of this is too difficult for this user, the user needs to return to a screen for selecting a level and again select the help information in a level for beginner.

According to the technique managing a degree of skill depending on a skill of individual operator based on a personal ID information, the apparatus simply stores a degree of skill of the operator. If the user accidentally forgets an operation on that day which the user could do in the past, or the user forgets the operation since a considerable time has been elapsed since he or she operated last, the user needs to select a level of the help information again after all. It is hard to say that this method is perfect.

Particularly, in the case of an apparatus in which an error occurs infrequently (such as a cash depositing/paying machine in bank under an obligation that, for example, a medium is supplied at a fixed time everyday), it happens often that the operator could operate the last time, but cannot this time. If a level of skill of a user is decided fixedly and a help information according to the level is reproduced, an inefficient work might be forced to the user.

There is, therefore, a demand for a technique in which a user can use help information meeting a level of the user by selecting a level of the help information in a hierarchical configuration as in a step-by-step down fashion, while referring to contents of the help information categorized in different levels of difficulty. There is also a demand for a development of a system by which the user can automatically use the help information while confirming a progress of recovery with the aid of mechanical sensors without troubling the user himself or herself.

If plural events such as errors occur simultaneously, the operation guidance has been given for each event. It is very ineffective that the user takes measures for each event. In the worst case, it might happen that the user needs to do a work twice, which can be omitted if an order of work is taken into consideration. Therefore, there is a demand for a technique which can realize reproduction of help information in different levels of difficulty and detail depending on a skill of the user, and can cope with error in the most efficient order without a need to repeat the same operation by omitting a useless work if plural errors occur.

The above-stated multi-media used for guidance of an operation or the like has been spread in recent years, particularly. As a result, a multi-media title for providing multi-media information or a reproducing apparatus used therefor become quickly popular. Typically, the user at the end of the multi-media (an end user) can use the multi-media information only along a scenario prepared in advance by a multi-media title producer.

However, interactivity of information is a material element that decides a spread of multi-media softwares. It is desired that the end user can use only a desiring information reproduced, in a mode meeting a demand of the user and efficiently, not only being provided a scenario prepared by a producer of the multi-media title. The multi-media title requires a considerable large storage capacity. For this, it is impossible to use a portable small capacity storage medium such as a floppy disk for the multi-media title.

SUMMARY OF THE INVENTION

To overcome the above problems, an object of this invention is to provide an operation guidance information reproducing method and an operation guidance information reproducing apparatus, by which operation guidance information can be automatically used so as to improve the efficiency of an operation, and which can reproduce the operation guidance information efficiently even if plural events requiring an operation guidance occur. Another object of this invention is to provide a multi-media information reproducing method and multi-media information reproducing apparatus, by which the user can readily produce and reproduce a multi-media title, and watch and listen efficiently only necessary information.

This invention therefore provides an operation guidance information reproducing method for reading operation guidance information depending on an event from a database, reproducing and notifying it to an operator when the event requiring measures taken by the operator occurs in an object apparatus, comprising the step of reproducing the operation guidance information about measures that should be taken to a condition of said apparatus changing with a progress of the measures taken by the operator at a terminal apparatus connected to said object apparatus and managing said object apparatus to notify the operation guidance information to the operator.

The present invention also provides an operation guidance information reproducing apparatus comprising a reproduction control unit for reading operation guidance information depending on an event from a database when the event requiring measures taken by an operator occurs in an object apparatus to control reproduction of said operation guidance information, and a reproducing unit controlled by said reproduction control unit for reproducing said operation guidance information to notify it to the operator, said reproducing unit being a terminal apparatus connected to said object apparatus to be able to manage said object apparatus, said operation guidance information about measures that should be taken to a condition of said object apparatus changing with a progress of the measures taken by the operator being reproduced at said terminal apparatus.

According to the above method and apparatus, an operation guidance information about measures that should be next taken to a condition of an object apparatus changing with a progress of measures taken by an operator is reproduced at a terminal apparatus, which is connected to the object apparatus to manage it. The terminal apparatus has a display unit. The detailed operation guidance information is reproduced at the display unit so that the operator can accurately grasp a procedure of the operation. Further, the terminal apparatus is provided in advance to manage the object apparatus. It is therefore unnecessary to newly provide an apparatus served to reproduce the detailed operation guidance information so that the accurate operation procedure may be reproduced at a low cost.

The present invention further provides an operation guidance information reproducing method for reading operation guidance information depending on an event from a database, reproducing and notifying it to an operator when the event requiring measures taken by the operator occurs in an object apparatus, comprising the steps of detecting a condition of said object apparatus changing with a progress of measures taken by the operator, and successively reproducing the operation guidance information about the measures that should be taken to a present condition of said object apparatus in linkage with a detected condition of said object apparatus and notifying it to the operator.

The present invention also provides an operation guidance information reproducing apparatus comprising a reproduction control unit for reading operation guidance information depending on an event from a database when the event requiring measures taken by an operator occurs in an object apparatus to control reproduction of said operation guidance information, and a reproducing unit controlled by said reproduction control unit for reproducing said operation guidance information to notify it to the operator, said reproduction control unit receiving a condition of said object apparatus changing with a progress of measures taken by the operator as a result of detection by a sensor in said object apparatus, controlling said reproducing unit to successively reproduce the operation guidance information about the measures that should be taken to a present condition of said object apparatus in linkage with a condition of said object apparatus.

According to these method and apparatus, an operation guidance information about measures that should be taken to a present condition of an object apparatus is successively reproduced in linkage with the condition of the object apparatus changing with a progress of the measures taken by the operator so that the user can use the operation guidance information automatically without bothering the operator himself or herself. This improves the operation efficiency to a great extent.

The present invention further provides an operation guidance information reproducing method for reading operation guidance information depending on an event from a database, reproducing and notifying it to an operator when the event requiring measures taken by the operator occurs in an object apparatus, comprising the step of reproducing contents in the lowest degree of detail as said operation guidance information, then successively reproducing contents in a gradual higher degree of detail according to a request by the operator.

The present invention also provides an operation guidance information reproducing apparatus comprising a reproduction control unit for reading operation guidance information depending on an event from a database when the event requiring measures taken by an operator occurs in an object apparatus to control reproduction of said operation guidance information, a reproducing unit controlled by said reproduction control unit for reproducing said operation guidance information to notify it to the operator, and an input unit for instructing to alter a degree of detail of the operation guidance information reproduced by said reproducing unit, said reproduction control unit controlling to reproduce the operation guidance information having contents in the lowest degree of detail at said reproducing unit, and controlling to successively reproduce the operation guidance information having contents in a gradually higher degree of detail whenever receiving an instruction or a request to alter the degree of detail from the operator through said input unit.

According to the above method and apparatus, an operation guidance information having contents from the lowest degree of detail to a higher degree of detail is successively reproduced in a step-by-step fashion according to a user's demand so that the operation guidance meeting a level of an operator is efficiently provided without forcing an inefficient work to the operator.

The present invention still further provides an operation guidance information reproducing method for reading operation guidance information depending on an event from a database, reproducing and notifying it to an operator when the event requiring measures taken by the operator occurs in an object apparatus, comprising the steps of storing in advance said operation guidance information in a state of measures information parts obtained by deassembling said operation guidance information into parts each of which is a minimum unit of measures which may be taken to said object apparatus by the operator in said database, reading the plural measures information parts depending on said event from said database, determining the order of reproducing said plural measures information parts such as to avoid the same measures information part from duplicating depending on said event, and successively reproducing said plural measures information parts in said order of reproduction, notifying them as the operation guidance information depending on said event to said operator.

The present invention also provides an operation guidance information reproducing apparatus comprising a reproduction control unit for reading operation guidance information depending on an event from a database when the event requiring measures taken by an operator occurs in an object apparatus to control reproduction of said operation guidance information, a reproducing unit controlled by said reproduction control unit for reproducing said operation guidance information to notify it to the operator, said operation guidance information in a state of measures information parts obtained by deassembling said operation guidance information into parts each of which is a minimum unit of measures taken to said object apparatus by the operator being stored in advance in said database, a searching unit for searching for plural measures information parts depending on said event in said database, and an order determining unit for determining an order of reproducing said plural measures information parts searched by said searching unit such as to avoid duplication of the same measures part, said reproducing control unit successively reproducing said plural measures information parts from said database in the order of reproduction determined by said order determining unit at said reproducing unit.

According to the above method and apparatus, the operation guidance information is deassembled into parts each of which is a minimum unit of measures, thereby producing and reproducing the operation guidance information such as to avoid duplication of the same measures information part. The operation guidance information may therefore be reproduced without a useless operation and repetition of the same operation, and measures that should be next taken to an occurring event in the most efficient order may be notified as the operation guidance information to the operator.

The present invention still further provides a multi-media reproducing method for reproducing multi-media information including image information and sound information comprising the steps of storing in advance said multi-media information in a state of multi-media parts obtained by deassembling said multi-media information into parts each of which is a unit according to contents of the information, forming sequence data made up of key data designating each multi-media part in order to determine an order of reproducing plural voluntary multi-media parts in said database according to an instruction from a user, and reading said plural multi-media data parts from said database according to said sequence data produced, successively reproducing them.

The present invention also provides a multi-media information reproducing apparatus having a display unit for reproducing image information and a sound outputting unit for reproducing sound information in order to reproduce multi-media information including the image information and the sound information, comprising a database for storing in advance said multi-media information in a state of multi-media parts obtained by deassembling said multi-media information into parts each of which is a unit according to contents of the information, an input unit for inputting necessary instruction to reproduce the multi-media parts in said database, a sequence data forming means for forming a sequence data made up of key data designating each multi-media part in order to determine an order of reproducing a plural voluntary multi-media data parts in said database according to an instruction through said input unit, and a sequence data reproducing means for reading said plural multi-media parts from said database according to the sequence data formed by said sequence data forming means when receiving an instruction to start reproduction through said input unit, successively reproducing said plural multi-media data parts at said display unit and said sound outputting unit.

According to the above multi-media reproducing method and apparatus, when the user voluntarily select multi-media parts formed in advance, each of the selected parts is automatically reproduced in order of reproduction so that a multi-media title including only a necessary information in a mode meeting a user's demand may be readily formed and reproduced. The user may thereby efficiently watch and listen only necessary information.

BRIEF DESCRIPTION OF THE DRAWINGS

FIG. 8 shows an error code setting screen according to the first embodiment;

FIGS. 16 through 19 are flowcharts illustrating a procedure of a reproducing process for multi-media help information according to the first embodiment;

FIGS. 33(a) through 33(k) show actual displays for the purpose of illustrating an operation of the third embodiment.

DESCRIPTION OF THE PREFERRED EMBODIMENT (A) Description of Aspects of the Invention FIG. 1 is a block diagram showing an aspect of this invention. In FIG. 1, reference numeral 1A denotes a reproduction control unit. The reproduction control unit 1A reads operation guidance information depending on an event from a database 4 and controls reproduction of this operation guidance information when the event which needs any measures taken by an operator occurs in an object apparatus 3.

Figure 1:
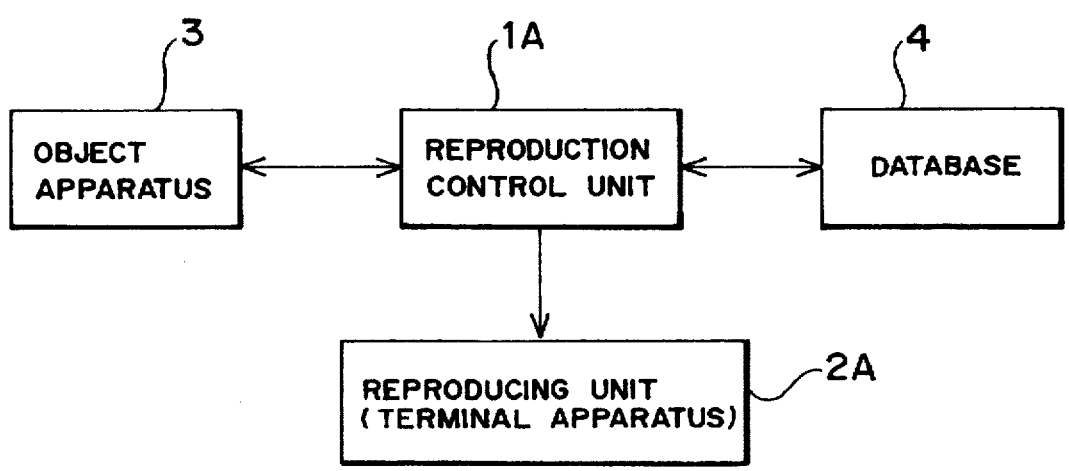
FIGS. 1 through 5 are block diagrams showing aspects of this invention.

Reference numeral 2A denotes a reproducing unit. The reproducing unit 2A reproduces the operation guidance information and notifies it to the operator under a control of the reproduction control unit 1A. According to this invention, the reproducing unit 2A is a terminal apparatus which is connected to the object apparatus 3 and is capable of managing it. At the terminal apparatus 2A, the operation guidance information about measures that should be taken to a condition of the object apparatus 3 changing with a progress of the measures taken by the operator is reproduced.

In the operation guidance information reproducing method and apparatus of this invention having been described with reference to FIG. 1, the operation guidance information about measures that should be taken to a condition of the object apparatus 3 changing with a progress of the measures taken by an operator is reproduced on a display unit of the terminal apparatus (the reproducing unit)) 2A. It is therefore possible to grasp in detail the operation guidance for the individual object apparatus 3 through the display unit of the terminal apparatus 2A.

As this, according to the operation guidance information reproducing method and apparatus of this invention shown in FIG. 1, detailed operation guidance information is reproduced on the display unit of the terminal apparatus 2A so that the operator can grasp accurately a procedure of the operation. The terminal apparatus 2A is installed in advance for controlling the object apparatus 3. Accordingly, it is unnecessary to newly provide an apparatus for reproducing detailed operation guidance information so that correct reproduction of the operation procedure may be realized at a low cost.

Figure 2:
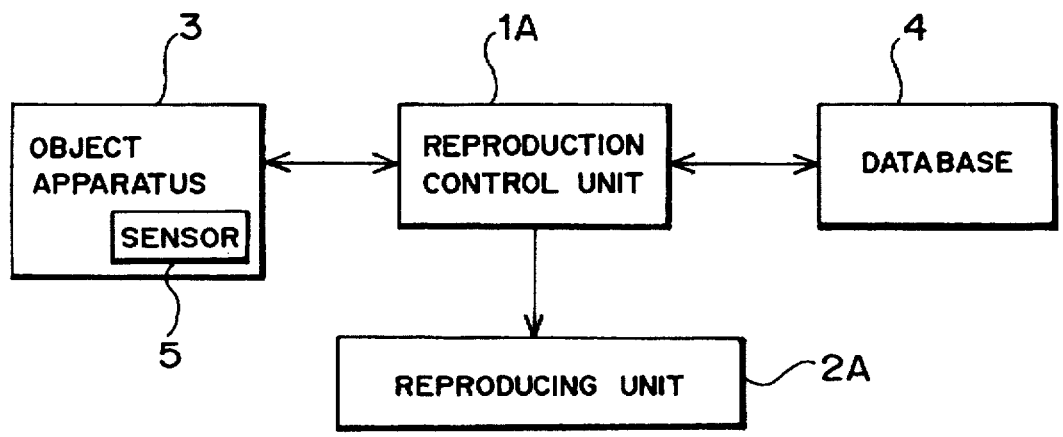

FIG. 2 is a block diagram showing another aspect of the invention. In FIG. 2, reference numeral A1 denotes a reproduction control unit. The reproduction control unit 1A reads an operation guidance information depending on an event from a database 4 and controls reproduction of this operation guidance information when the event which needs any measures taken by an operator occurs in an object apparatus 3.

Reference numeral 2 denotes a reproducing unit. The reproducing unit 2 reproduces the operation guidance information and notifies it to the operator under a control of the reproduction control unit 1A.

The reproduction control unit 1A of the invention receives a condition of the object apparatus 3 changing with a progress of the measures taken by the operator as a result of detection by a sensor 5 in the object apparatus 3, and controls a reproducing unit 2 to successively reproduce the operation guidance information about the measures which should be taken to a present condition of the object apparatus 3 in linkage with a condition of the object apparatus 3.

In the operation guidance information reproducing method and apparatus of this invention having been described with reference to FIG. 2, the sensor 5 detects a condition of the object apparatus 3 changing with a progress of the measures taken by the operator, and the reproduction control unit 1A controls the reproducing unit 2 to automatically and successively reproduce the operation guidance information about the measures that should be taken to a present condition of the object apparatus 3 on the basis of a result of detection by the sensor 5 in linkage with a condition of the object apparatus 3.

In consequence, it is unnecessary that the operator gives an instruction every occasion in order to refer to the next operation guidance. It is therefore possible that the operator can automatically use the operation guidance information without troubling himself or herself. This results in a large improvement in the operation efficiency.

Figure 3:
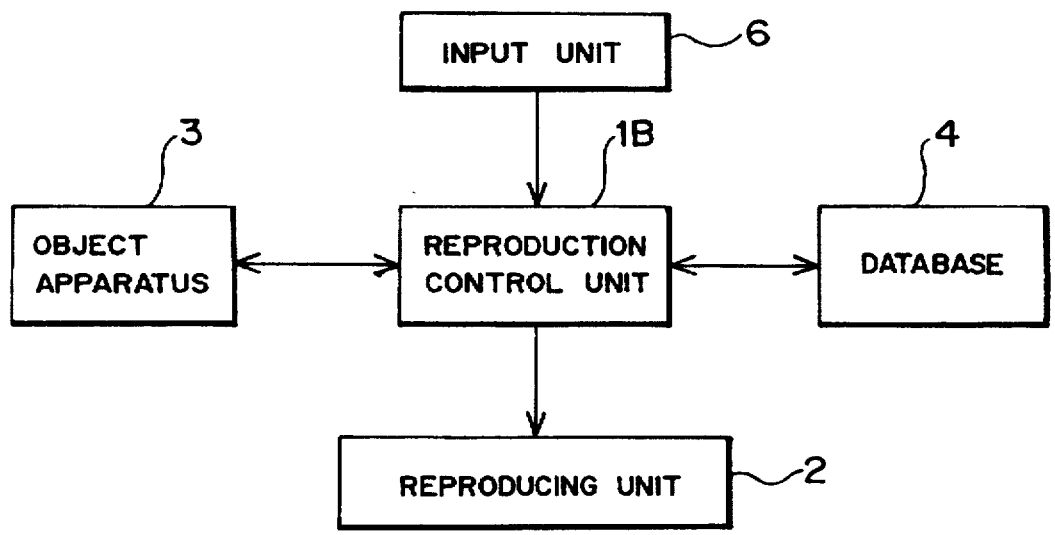

FIG. 3 is a block diagram showing still another aspect of this invention. In FIG. 3, reference numeral 1B denotes a reproduction control unit having a function similar to that of the reproduction control unit 1A having been described with reference to FIG. 1. Reference numeral 6 denotes an input unit for giving an instruction to alter a degree of detail of the operation guidance information reproduced by a reproducing unit 2.

The reproduction control unit 1B of this invention reproduces the operation guidance information having contents in the lowest degree of detail, and controls the reproducing unit 2 to successively reproduce the operation guidance information having contents of a higher degree of details step by step every time the operator gives an instruction or a request to alter the degree of detail through an input unit 6.

In the operation guidance information reproducing method and apparatus of this invention having been described with reference to FIG. 3, the reproduction control unit 1B reproduces first the operation guidance information having contents in the lowest degree of detail at the reproducing unit 2. Each time the operator gives an instruction or a request to alter the degree of detail through the input unit 6, the operation guidance information having a higher degree of detail is successively reproduced step by step at the reproducing unit 2.

In consequence, it is possible that the operator can use the operation guidance information in a level meeting a level of the operator himself or herself as descending a hierarchical stage of degrees of detail, while referring to contents of the operation guidance information depending on a degree of detail by himself or herself. Namely, the reproduction control unit 2 reproduces the operation guidance information having contents in the lowest degree of detail, then successively reproduces the operation guidance information having contents in a higher degree of detail step by step in response to a request by the operator. It is therefore possible to guide the operation depending on a level of the operator efficiently without forcing the operator to do an inefficient work.

Figure 4:
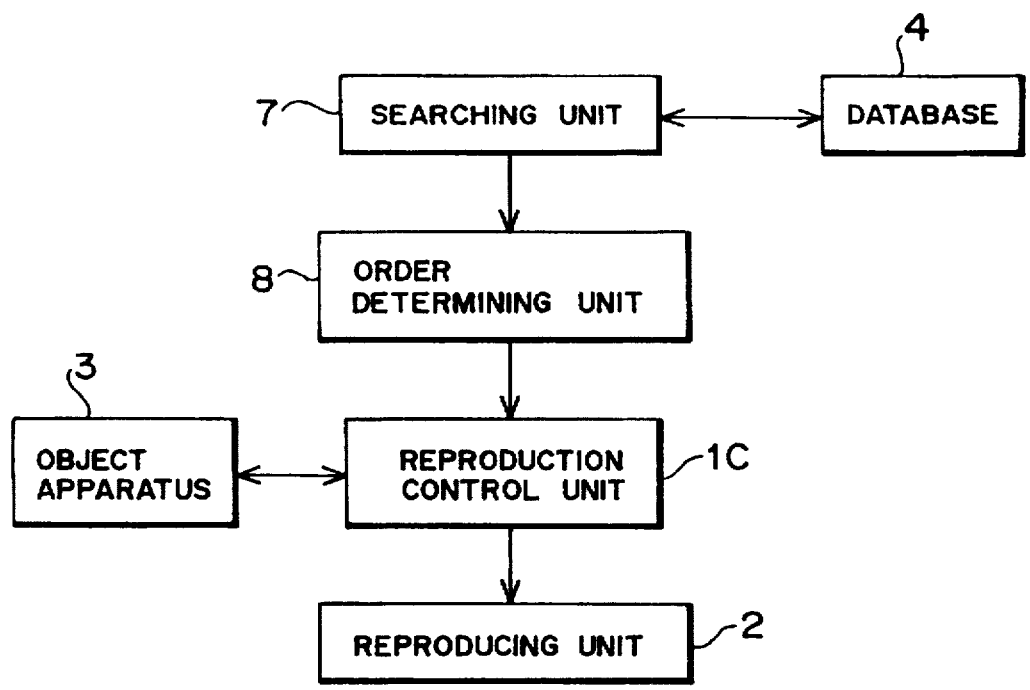

FIG. 4 is a block diagram showing still another aspect of this invention. In FIG. 4, reference numeral 1C denotes a reproduction control unit having a function similar to that of the reproduction control unit 1A having been described with reference to FIGS. 1 and 2. In a database 4, the operation guidance information is stored in advance in a state of measures information parts obtained by deassembling the operation guidance information into parts each of which is a minimum unit of measures that can be taken to the object apparatus 3 by the operator.

Reference numeral 7 denotes a searching unit for searching for plural measures information parts in a database 4 depending on an event occurring in the object apparatus 3. Reference numeral 8 denotes an order determining unit for determining an order of reproducing the plural measures information parts searched by the searching unit 7 depending on the event such as to avoid duplication of the same measures information part.

The reproduction control unit 1C of this invention controls the reproducing unit 2 to successively reproduce the plural measures information parts fed from the database 4 in the order of reproduction determined by the order determining unit 8.

In the operation guidance information reproducing method and apparatus of this invention having been described with reference to FIG. 4, the searching unit 7 searches for plural measures information parts depending on an event occurring in the object apparatus 3 in the database 4, and the reproduction order determining unit 8 determines an order of reproducing the plural measures information-parts searched by the searching unit 7 such as to avoid duplication of the same measures information part.

After that, the reproduction control unit 1C successively reproduces the plural measures information parts fed from the database 4 in the order of reproduction determined by the order determining unit 8 at the reproducing unit 2.

If a plurality of events occur simultaneously in the object apparatus 3, it is possible to notify the operation guidance information depending on these events to the operator in one reproduction without repeating the same operation. For this, useless operation may be omitted.

According to the operation guidance information reproducing method and apparatus of this invention shown in FIG. 4, it is possible to form and reproduce the operation guidance information such as to avoid duplication of the same measures information part by deassembling the operation guidance information into parts each of which is a minimum unit of the measures. It is therefore possible to notify the operation guidance information to treat the occurring events in the most efficient order, thereby omitting useless operation and avoiding repetition of the same operation.

The reproducing unit 2 may be configured with a display unit for reproducing and displaying the operation guidance information as an image. It is also possible to reproduce and display the operation guidance information on the display unit as an image of an actual procedure of the operation visualized from a viewpoint of the operator looking at the object apparatus 3.

In the above case, contents of the operation can be notified to the operator quite comprehensively so that the operator can grasp the procedure of the operation visually.

It is also possible to reproduce and display the operation guidance information as character information explaining an actual procedure of the operation on the display unit along with the image. The apparatus of this invention may further includes a sound outputting unit as the reproducing unit 2 for reproducing and outputting the operation guidance information as a sound, thereby reproducing and outputting sound information explaining an actual procedure of the operation from the sound outputting unit in simultaneous with a reproduction and a display of the image on the display unit. As a result, it is possible that a multi-media function can be used effectively, the operator can grasp the procedure of the operation more certainly thereby.

It is also possible to reproduce the operation guidance information in the terminal apparatus connected to the object apparatus 3, which can manage the object apparatus 3. It is also possible that the database 4 is commonly used by another apparatus provided on the side of an upper apparatus. In this case, a function of the operation guidance information reproducing apparatus of this invention can be realized in the terminal apparatus managing the object apparatus 3. The database 4 is installed on the side of the upper apparatus and commonly used by another apparatus, whereby the database 4 (a system source) can be used effectively. Accordingly, the function as the operation guidance information reproducing apparatus of this invention may be readily realized without another apparatus separately provided. The database is provided on the side of the upper apparatus and used commonly by another terminal apparatus (the operation guidance information reproducing apparatus) so that the system source may be effectively utilized.

Figure 5:
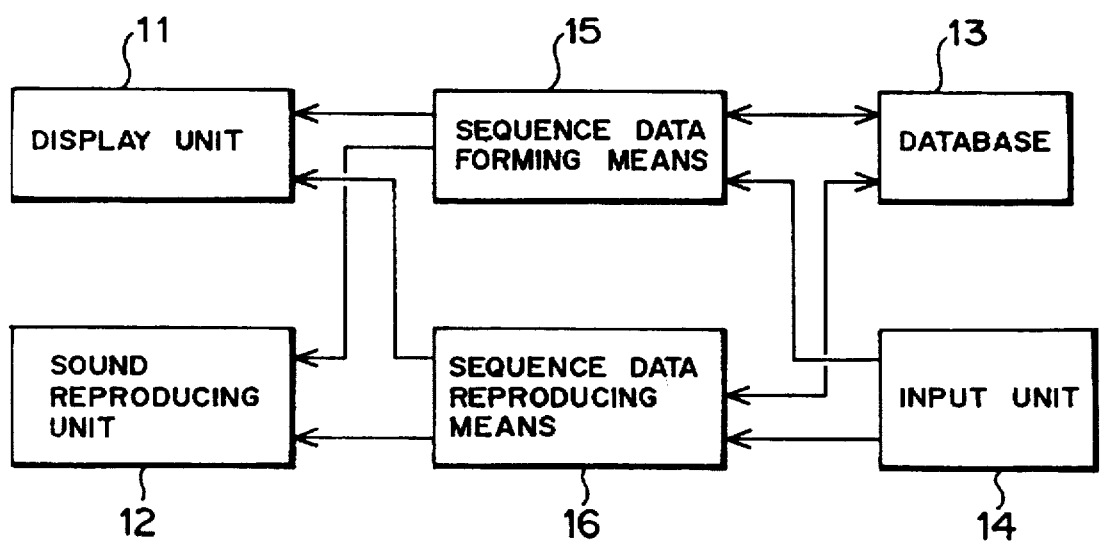

FIG. 5 is a block diagram of still another aspect of this invention. In FIG. 5, reference numerals 11 and 12 denote a display unit for reproducing image information and a sound outputting unit for reproducing sound information, both of which are used for reproducing multi-media information including the image information and the sound information, respectively.

Reference numeral 13 denotes a database, 14 denotes an input unit, 15 denotes a sequence data forming means, and 16 denotes a sequence data reproducing means.

The database 13 serves to store multi-media information in advance in a state of multi-media data parts obtained by deassembling the multi-media information into parts each of which is a minimum unit according to contents of the information. The input unit 14 is used to input an instruction necessary to reproduce the multi-media data parts in the database 13.

The sequence data forming means 15 forms a sequence data made up of key data designating each of the multi-media parts for the purpose of determining an order of reproducing plural voluntary multi-media parts in the database 13 according to an instruction through the input unit 14.

The sequence data reproducing means 16 reads plural multi-media data parts according to a sequence data formed by the sequence data forming means 15 when receiving an instruction to start a reproduction through the input unit 14, and successively reproduce the plural multi-media data parts at the display unit 11 and the sound output unit 12.

It is possible that the sequence data forming means 15 reproduces information necessary to form a sequence data at the display unit 11 and the sound outputting unit 12, and forms a sequence data by receiving an input of an instruction from the user who is referring to this information through the input unit 14.

Each of the multi-media parts may be configured with unique key data of each multi-media data part, image data for one scene and sound data for one scene, and control data for the image data and the sound data.

In the multi-media information reproducing method and apparatus of this invention having been described with reference to FIG. 5, the sequence data forming means 15 forms a sequence data configured with key data designating multi-media parts according to an instruction through the input unit 14, and determines an order of reproducing plural voluntary multi-media parts in the database 13.

When receiving an instruction to start a reproduction through the input unit 14, the sequence data reproducing means 16 reads plural multi-media data parts from the database 13 according to a sequence data formed by the sequence data producing means 15, and successively reproduces the plural multi-media parts at the display unit 11 and the sound outputting unit 12.

In consequence, when the user voluntarily selects the multi-media data parts formed previously, each of the selected parts is automatically reproduced in the order of reproduction of the parts (sequence data) so that it is possible for the user to readily form a multi-media title configured with only desiring information in a mode of reproduction meeting a user's demand and reproduce it.

The sequence data forming means 15 reproduces information necessary to form a sequence data at the display unit 11 and the sound outputting unit 12. The user inputs an instruction through the input unit 14 by referring to that information to proceed a formation of sequence data in an interactive mode. It is therefore possible for a user who knows nothing about a manner to form the sequence data to readily form a multi-media title.

The multi-media data part may be configured with key data, image data and sound data each for one scene, and control data for these data so that it is possible to select one part for each scene to 3 configure a multi-media title. It is also possible to apply a special effect to the image data and the sound data by virtue of the control data when they are reproduced.

As above, according to the multi-media information reproducing method and apparatus of this invention shown in FIG. 5, when the user voluntarily selects the multi-media data parts previously produced, selected parts are automatically reproduced in an order of reproduction of the parts so that it is possible to readily form and reproduce a multi-media title including only desiring information in a mode of reproduction meeting a user's demand. The user can effectively watch and listen only necessary information.

By forming the sequence data in the interaction with the user, the user who knows nothing about a manner to form can readily form a multi-media title and use effectively only necessary information.

One part is selected for only one scene. This allows an easy formation of a multi-media title having plural scenes. In addition to this, it is possible to apply a special effect by virtue of the control data when each part is reproduced.

(B) Description of First Embodiment

Hereinafter, description will be made of an embodiment of this invention referring to the drawings.

Figure 6:
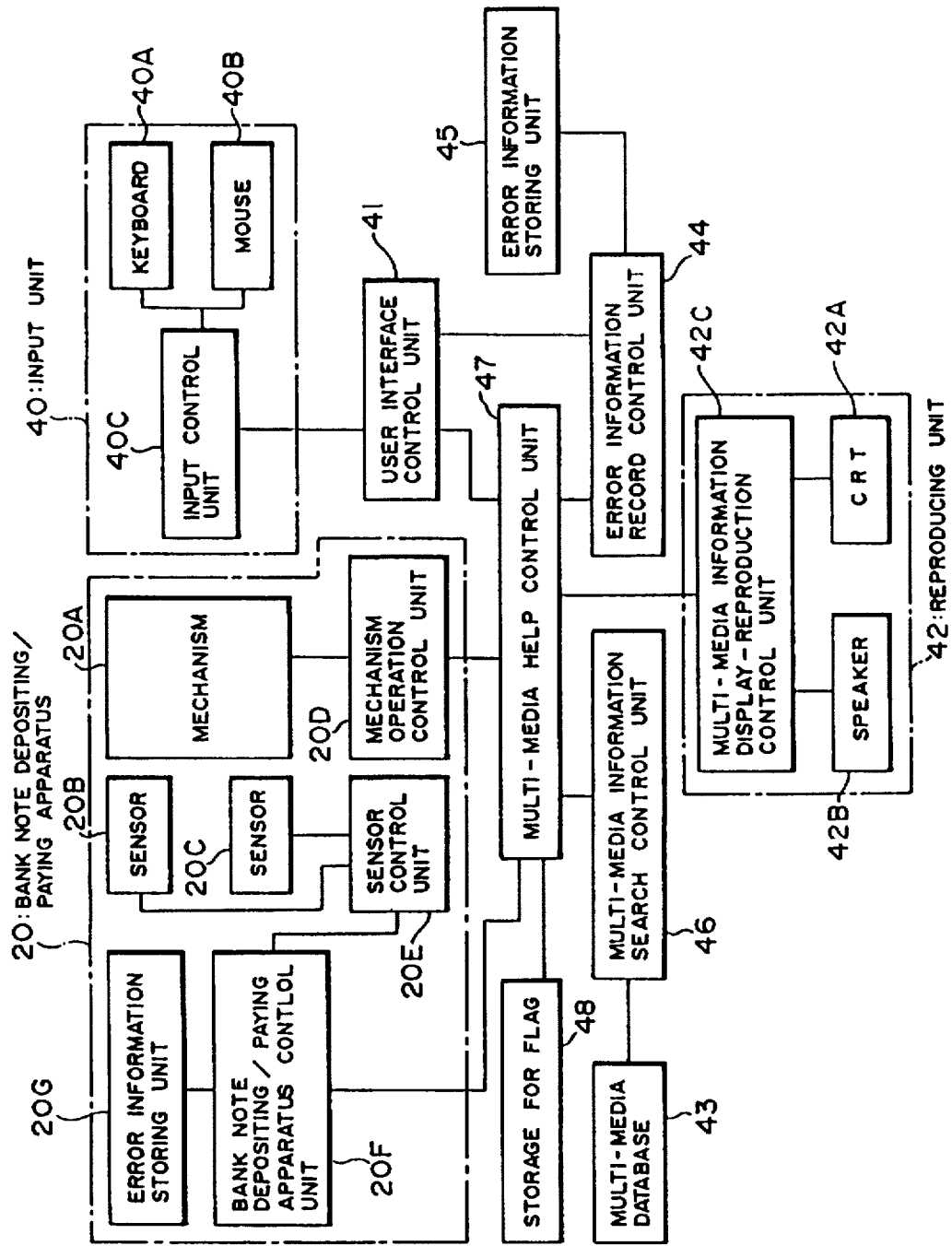
FIG. 6 is a block diagram showing a structure of an operation guidance information reproducing apparatus according to a first embodiment of this invention.

FIG. 6 is a block diagram showing a structure of an operation guidance information reproducing apparatus as a first embodiment of this invention. In FIG. 6, reference numeral 20 denotes a bank note depositing/paying apparatus (a business apparatus, a peripheral equipment, an object apparatus) having a structure described later with reference to FIG. 7. When an event (referred collectively as an error, hereinafter) requiring any measures taken by an operator such as an error or a necessity of medium supply occurs in the bank note depositing/paying apparatus 20, the apparatus according to this embodiment senses a type of the error, automatically reproduces and displays a procedure of an operation for recovering the present error.

The bank note depositing/paying apparatus 20 is used for a service at the window in a bank or the like to deposit or pay bank notes exchanged in a transaction between an operator at the transaction window and a customer. The bank note depositing/paying apparatus 20 is, in general, disposed in the vicinity of the operator at the transaction window for the customer, and is connected to a terminal apparatus through which the operator inputs data. Via this terminal apparatus, the bank note depositing/paying apparatus 20 is managed its operational condition. A function of an operation guide information reproducing apparatus according to this embodiment described later is provided in, for example, the above-stated terminal apparatus.

Figure 7:
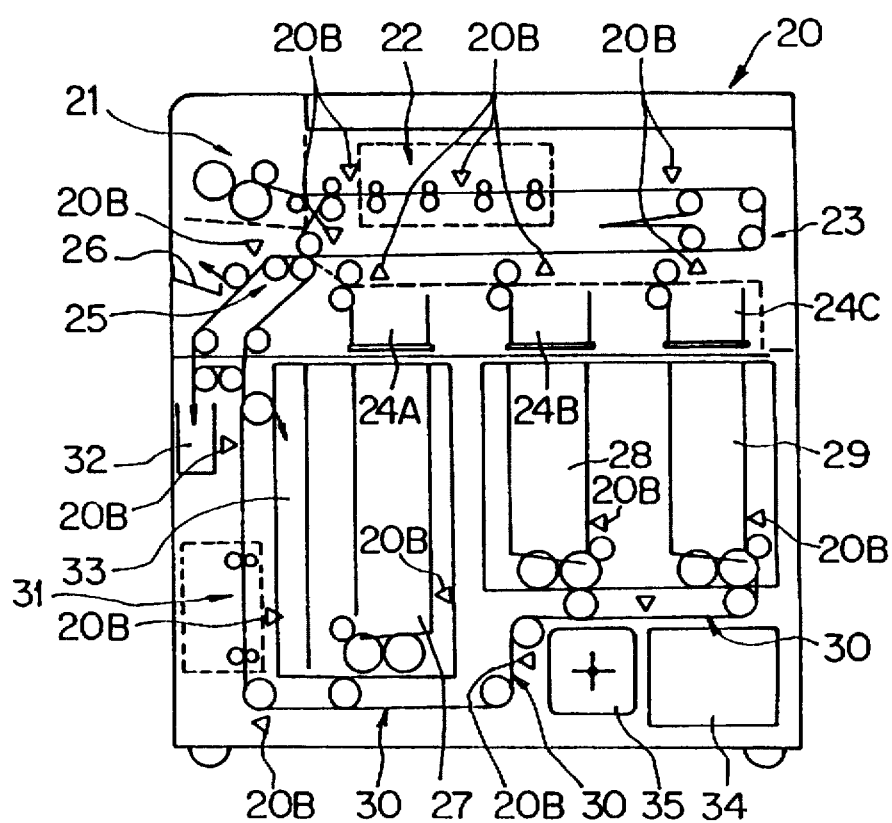
FIG. 7 is a schematic vertical sectional view showing a structure of an object apparatus (a bank note depositing/paying apparatus) and an arrangement of sensors according to the first embodiment.

The bank note depositing/paying apparatus 20 is configured, for example, as shown in FIG. 7.

In FIG. 7, reference numeral 21 denotes a note inlet into which bank notes are throw, 22 denotes a discriminating unit for discriminating the notes thrown in through the note inlet 21. 23 denotes a turning over unit for turning over the note. 24A through 24c denote temporarily holding units for temporarily holding the deposited notes. 25 denotes a reject separately conveying path for shunting an inappropriate note from a normal conveying path to discharge it, and 26 denotes a reject discharge opening for discharging the inappropriate note shunt by the reject separately conveying path 25.

Reference numeral 27 denotes a note cassette for storing and holding notes. 28 and 29 denote a first stacker and a second stacker, respectively, for storing and holding the notes. 30 denotes a lower conveying unit for paying notes from the note cassette 27, stacker 28 or 29, 31 denotes a paid note discriminating unit for discriminating notes fed from the note cassette 27, the stacker 28 or 29. 32 denotes a note outlet through which paid notes are discharged, and 33 denotes a reject box for taking inappropriate notes therein.

In order to convey the notes within the bank note depositing/paying apparatus 20, a number of rollers (no reference characters are attached) along the note conveying path, as shown in FIG. 7. These rollers are rotatably driven by a driving motor 35. The driving motor 35 receives an electric power supply from a power source unit 34 to operate.

In such a mechanism (a mechanism 20A in FIG. 6), optical sensors 20B are disposed in certain spots in the mechanism 20A to detect a jam of the note on the conveying path, a volume of the notes in the note cassette 27, the stackers 28 and 29, or presence or absence of the notes within the reject box 33. In addition to these, mechanical sensors 20c (refer to FIG. 6), not shown in FIG. 7, are disposed in certain spots to detect a condition of open or close of a door in front of the bank note depositing/paying apparatus 20, or a condition of installation of various mechanisms such as a mechanism housing chamber in the bank note depositing/paying apparatus 20 (referred mechanisms, hereinafter) against the bank note depositing/paying apparatus 20 itself.

As shown in FIG. 6, the bank note depositing/paying apparatus 20 has a mechanism operation control unit 20D for controlling a condition of operation of the mechanism 20A in the bank note depositing/paying apparatus 20, a sensor control unit 20E for grasping and supervising a condition of the mechanism 20A (such as an occurrence of an error) through the sensors 20B and 20C, an error information storing unit 20G and a bank note depositing/paying apparatus control unit 20F.

The error information storing unit 20G stores error codes (error information) of errors generating in the mechanism 20A beforehand. The bank note depositing/paying apparatus control unit 20F makes a search in the error information storing unit 20G on the basis of information having been collected by the sensor control unit 20E, and notifies a corresponding error code to a multi-media help control unit 47.

A structure of an apparatus according to this embodiment for reproducing operation guide information (help information) in terms of the bank note depositing/paying apparatus 20 above-mentioned will be next described referring to FIG. 6. In FIG. 6, reference numeral 40 denotes an input unit by which an operator inputs various information. The input unit 40 has a keyboard 40A, a mouse 40B and an input control unit 40C for managing a condition of inputs through the keyboard 40A or the mouse 40B.

Reference numeral 41 denotes a user interface control unit for receiving a signal from the input unit 40 (the input control unit 40C) and transferring the signal to a multimedia help control unit 47 or an error information record control unit 44, both described later. Reference numeral 42 denotes a reproducing unit reproduces multi-media information including image information and sound information. The reproducing unit 42 has a CRT (a display unit) 42A for reproducing the image information, a speaker (a sound outputting unit) 42B for reproducing the sound information, and a multi-media information display-output control unit 42C for controlling actual states of reproduction of the image information and the sound information at the CRT 42A and the speaker 42B.

Reference numeral 43 denotes a multi-media database. In the multi-media database 43 according to this embodiment, various operation guidance information in terms of the bank note depositing/paying apparatus 20 is stored in advance as multi-media information including the image information and the sound information.

Not only when an error (jam of note, short of note, etc.) requiring any measures taken by the operator in the bank note depositing/paying apparatus 20 occurs, but also when the operator needs an operation guidance with or without an error, the operation guidance information is reproduced as described later and notified to the operator.

In the multi-media database 43, the multi-media information in terms of the operation guidance information is stored in a state of multi-media help data parts (measures information parts; referred as simply parts, hereinafter) each of which is a minimum unit of measures taken by the operator to the bank note depositing/paying apparatus 20, as will be described later with reference to Table 2 or FIG. 11.

Each part includes the image information which is a visualized actual operational procedure from a viewpoint of the operator looking at the bank note depositing/paying apparatus 20, character information for illustrating the actual operational procedure (this may be included in the image information) and the sound information for illustrating the actual operational procedure.

Reference numeral 44 denotes an error information record control unit, 45 denotes an error information storing unit, 46 denotes a multi-media information search control unit (a searching unit), 47 denotes a multi-media help control unit (a reproduction control unit, an order deciding unit) and 48 denotes a storage for flags.

The error information record control unit 44 has a function to record an error record of each error occurring in the bank note depositing/paying apparatus 20, and a function to record and edit information about parts |part codes which designate parts (key data)| indispensable for constituting the help information used to cope with an error for each error code.

The error information record control unit 44, in association with the multi-media help control unit 46, has a function to record and edit a part code for each of various errors, a function to rearrange the part codes having been recorded and edited in order of operation and a function to allocate a sequence of the part codes to each error code. A state of the error information record by these means is displayed on the CRT 42A, for example, as will be described with reference to FIGS. 8 through 10, to be provided to the operator. The operator operates the keyboard 40A or the mouse 40B while referring the display to input desiring information, thereby recording and editing the error information in an interactive mode.

The information edited by the error information record control unit 44 is stored and retained in the error information storing unit 45 for each error code as, for example, a table shown in Table 1. In the error storing unit 45, only part codes for designating a part are recorded. Actual image information or sound information are not recorded in the error information storing unit 45.

The multi-media information search control unit 46 searches for parts in the multi-media database 43 according to an instruction from the multi-media help control unit 47 and information from the error information storing unit 45, as described later.

The multi-media help control unit 47 operates according to a flowchart, which will be described later with reference to FIGS. 14, 16 through 19, to function characteristically as this invention. The multi-media help control unit 47, in association with the mechanism operation control unit 20D, the sensor control unit 20E, the error information record control unit 44 and the multi-media information search control unit 46, controls to reproduce the multi-media information to display and output it.

More specifically, the multi-media control unit 47 detects an occurrence of an error at the mechanism 20A in the bank note depositing/paying apparatus 20 through the sensor control unit 20E. When receiving the occurrence of error from the sensor control unit 20E, the multi-media control unit 47 causes the error information record control unit 44 to search into the error information storing unit 45, takes out error information (refer to Table 1) according to an error code of the error occurring this time, causes the multi-media information search control unit 46 to search into the multi-media database 43 according to the error information (a sequence of part codes), and reproduces parts (the multi-media information) read out in order of reproduction decided on the basis of a sequence or the like of the part codes under its control.

A timing to reproduce, display and output the multi-media information of each part is determined in association with the sensor control unit 20E. In linkage with a state of the mechanism 20A, the multi-media information of each part is reproduced. Depending on a condition of record of the error information, a reset operation on the mechanism is performed through the mechanism operation control unit 20D.

Now, detailed description of functions of the multi-media help control unit 47 of this embodiment will be made. The multi-media control unit 47 has mainly three functions as below:

As a first function, the multi-media help control unit 47 receives a condition of the mechanism 20A changing with a progress of measures taken by the operator through the sensors 20B and 20C and the sensor control unit 20E, and causes the reproducing unit 42 to sequentially reproduce the help information in terms of measures that should be taken to a present condition of the mechanism 20A in linkage with a condition of the mechanism 20A, as stated before.

As a second function, the multi-media help control unit 47 controls to reproduce operation guidance information having contents in the lowest degree of detail (help information for seniors) at the reproducing unit 42, and controls to successively reproduce operation guidance information in a gradual higher degree of detail (help information for operators in the middle level, help information for beginners) at the reproducing unit 42 controllably whenever the operator directs or requests alteration of a degree of detail through the input unit 40.

As a third function, when a plurality of errors occur simultaneously in the mechanism 20A, the multi-media help control unit 47 sorts all part codes corresponding all the errors searched in the error information storing unit 45 by the error information record control unit 44. If there are the same part codes, the multi-media help control unit 47 adds one of these same part codes to the order (a sequence) of reproduction of the help information such as to prevent the same part from duplicating in order of reproduction of the parts. The multi-media control unit 47 controls the reproducing unit 42 to successively reproduce the parts obtained by a search into the database 43 by the multi-media information search control unit 46 in the determined order of reproduction.

The storage 48 for flags stores various flags therein set upon a control operation by the multi-media help control unit 47. In practice, a part flag used for clearly indicate a part in which a treatment to the mechanism 20A has been finished and a displaying-reproducing process has been completed or the like is set and retained in the storage 48, as will be described later with reference to FIGS. 18 and 19.

Figure 18:
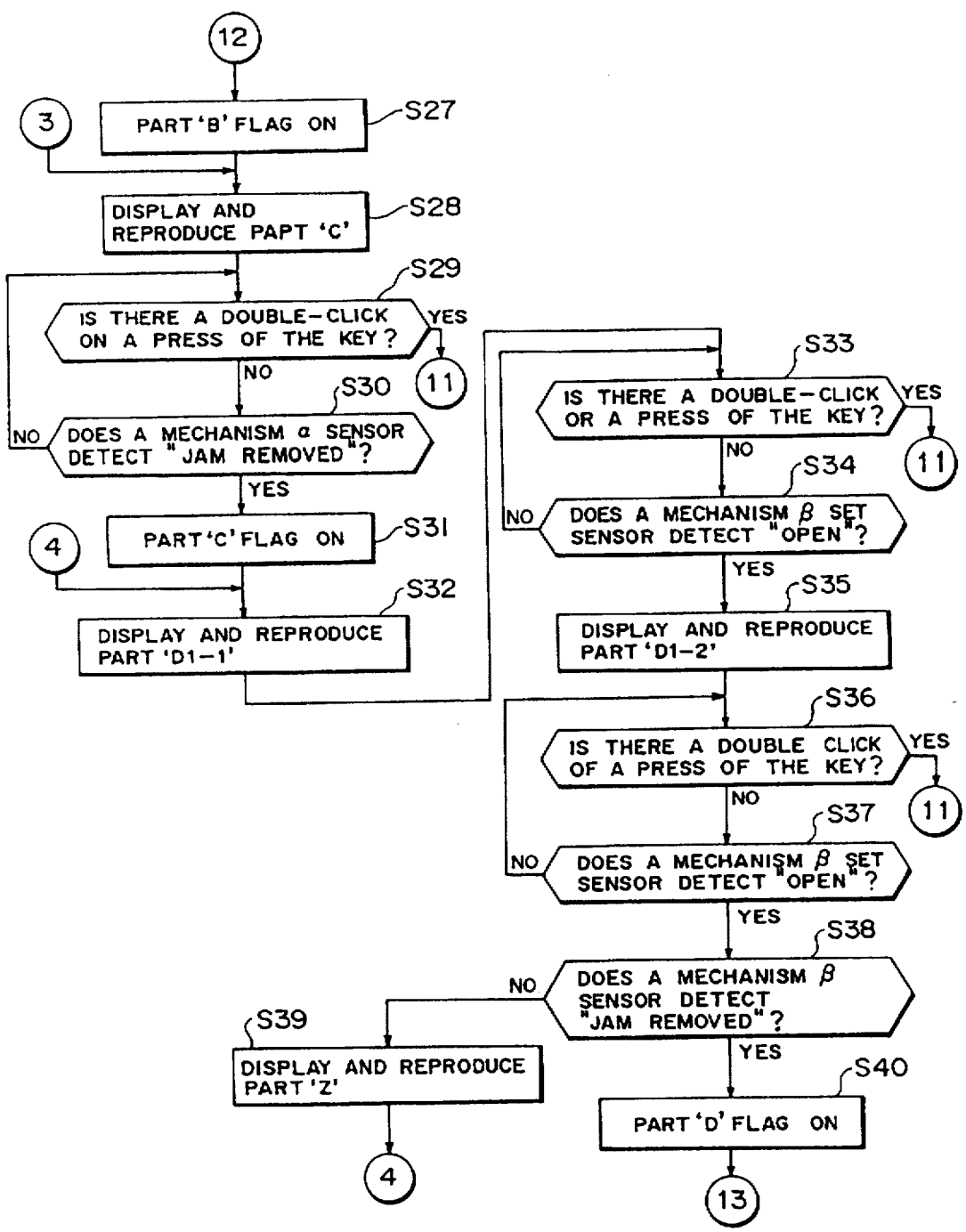

An operation of the operation guidance information reproducing apparatus of this embodiment having the above structure will be next described with reference to FIGS. 18 and 19.

First, the third function of the above-mentioned multi-media help control unit 47 (that is, a function to combine parts without duplicating the same work to enable an operation guidance in the most efficient order if a plurality of errors occur simultaneously) will be described by way of a practical example.

Incidentally, under a condition of a screen display described in following items (a1) through (a3) among the items (a1) through (a4), the multi-media help control unit 47 and the error information record control unit 44 operate in association according to a request (an input of an instruction through the input unit 40) from the user (the operator) so that a result of the error information record is stored in the error information storing unit 45 through the error record control unit 44.

(a1) The user (the operator) records all error events recoverable by himself or herself for each type of errors. On this occasion, each type of errors are labeled a unique error code. An example of display of an error code setting screen on the CRT 42A is shown in FIG. 8. On the screen shown in FIG. 8, a unique error code "00003" is set to, for example, a type of error "note jam occurring in mechanism γ" (a note jam occurring in the mechanism γ constituting the mechanism 20A), as indicated by a shaded portion. In this stage, no part structure for this type of error is not yet recorded.

Figure 9:
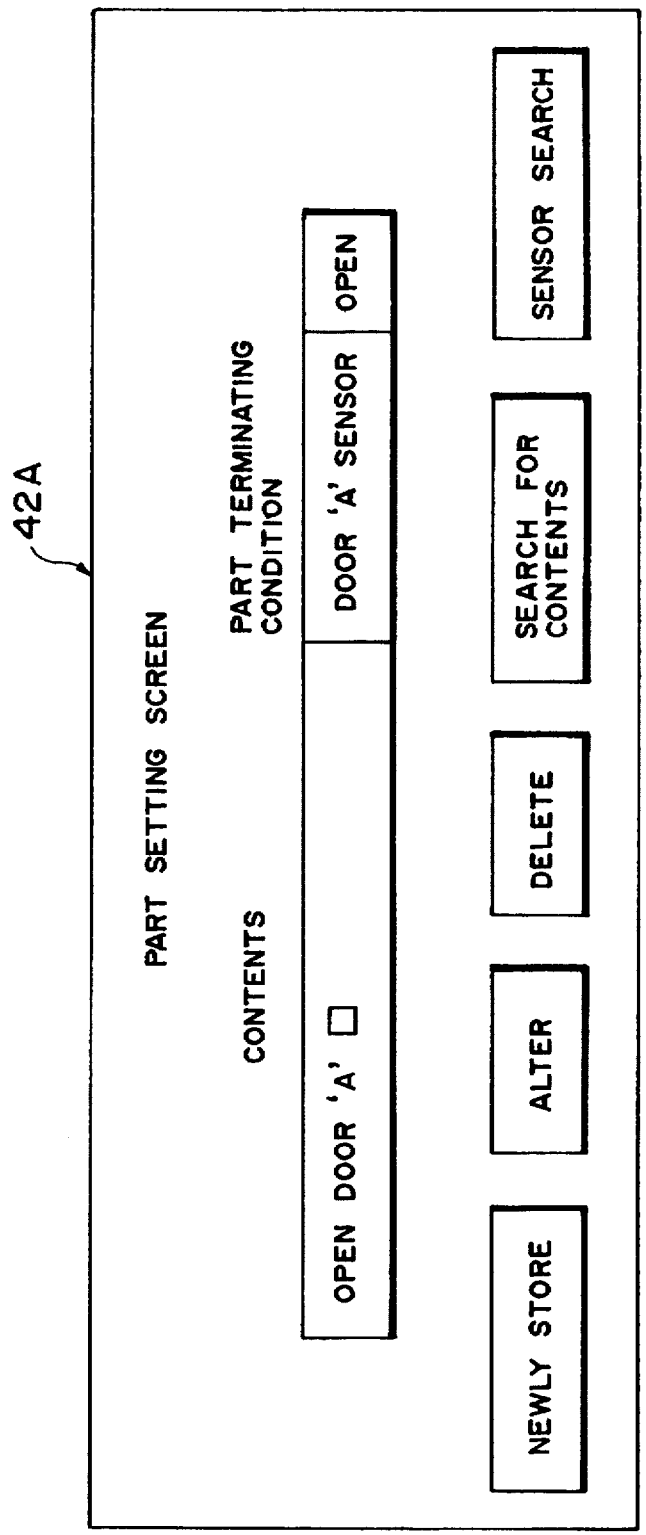
FIG. 9 shows a part setting screen according to the first embodiment.

(a2) A flow of an operation to treat an error corresponding to each error code is divided into units on the time axis as small as possible and stored as parts. A type and a condition of a sensor that becomes a terminating condition of the part are stored at the same time. FIG. 9 shows an example of display of a part setting screen on the CRT 42A at that time. In the screen in FIG. 9, contents of a part A that is "open door A" is displayed besides a setting condition of a condition necessary to terminate a reproduction of that part (that is, the door A sensor becomes an open state, here). In a part setting screen in FIG. 9, regions of "newly store", "alter", "delete", "search for the contents" and "sensor search" are display in order to confirm and edit the contents of each part. Various operations are performed by clicking a mouse pointer in each region.

Figure 10:
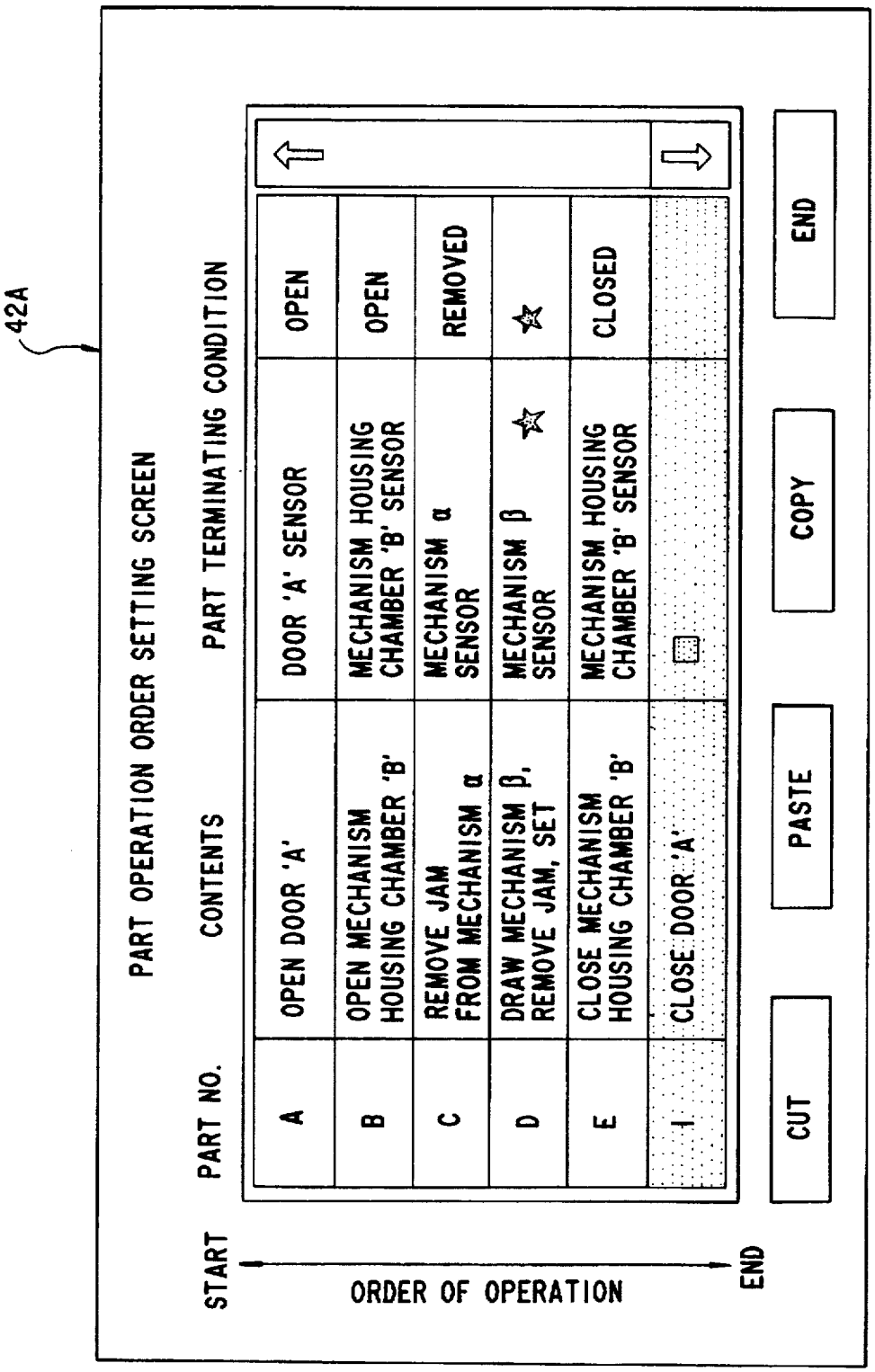
FIG. 10 shows a part operation order setting screen according to the first embodiment.

(a3) For each part recorded on the part setting screen in FIG. 9, an examination is made as to which order is most efficient and most effective to cope with the error to determine an ideal order of the implementation. The determined order of implementation is recorded through a part operation order setting screen. FIG. 10 shows an example of a display of the part operation order setting screen on the CRT 42A. On the screen in FIG. 10, a part number is automatically added and altered whenever each part is rearranged in order of operation.

(a4) When the setting of the order of operation, that is, the order of reproducing parts, through the part operation order setting screen shown in FIG. 10 is completed, the screen is automatically changed to an error code setting screen, as shown in FIG. 8. Under such a display condition, a part structure corresponding to each error code is inputted. An input of the part structure is performed by selecting a list box (on a window display) for "part selection" by which the user can see a list of the parts. If there is a common operation among different error codes, it is, of course, possible that the part is commonly used.

Meanwhile, it is possible to install in advance the above error codes, not by the operator such as a bank clerk, to save labour for recording the error codes by the operator.

Through a procedure described in the above items (a1) through (a4), a practical example of an procedure until an error code is labelled to an error event will be described below.

Assuming here that an error event is "occurrence of a note jam in the mechanism α" (that is, a note jam occurring in the mechanism α of the mechanism 20A).

error code: 00001 type of error: "a note jam in mechanism α"

type of part:
  (1) "open door A": open the door A in front of the apparatus;
  (2) "open mechanism housing chamber B": draw the mechanism housing chamber B from the body;
  (3) "remove the jam from mechanism α": remove the note jam from the mechanism α above the mechanism housing chamber B;
  (4) "close mechanism housing chamber B": push the mechanism housing chamber B into the body to set it;
  (5) "close door A": close the door A; terminating condition of each part:
    (1) door A sensor: open
    (2) mechanism housing chamber B sensor: open
    (3) mechanism α sensor: normal
    (4) mechanism housing chamber B sensor: close
    (5) door A sensor: close Assumed here, as an instance, that there are seven error events in all, and these errors are categorized as below. Table 1 shows priority 'a' through 'c' corresponding to each error code, types of error, parts indispensable for error recovery and sequences. Table 2 shows detailed contents of operations of part codes used in error codes 00001 and 00002. FIG. 11 shows an example of a relation among the part codes A through X.

TABLE 1

| error code | priority | type of error | parts necessary for error recovery and sequence |
|---|---|---|---|
| 00001 | a (priority; large) | mechanism α note jam | A -> B -> C -> E -> I |
| 00002 | a (priority; large) | mechanism β note jam | A -> B -> D -> E -> I |
| 00003 | a (priority; large | mechanism γ note jam | A -> G -> H -> I -> J |
| 01001 | b (priority; middle | medium supplement (1 million note) | K -> L -> M -> N -> R |
| 01002 | b (priority; middle | medium supplement (1 thousand note) | K -> O -> P -> Q -> R |
| 02001 | c (priority; small | time to clean the note inlet | S -> T -> U -> V -> X -> Y |
| 02002 | c (priority; small | time to clean the note outlet | S -> T -> W -> X -> Y |

TABLE 2

| part code | detail |
|---|---|
| A | open the door A in front of the apparatus |
| B | draw out the mechanism housing chamber B from the body |
| C | remove a note jam from the mechanism α above the mechanism housing chamber B |
| D | draw out the mechanism β from the mechanism housing chamber B, remove the note jam, push the mechanism into the mechanism housing chamber B to set it |
| E | push the mechanism housing chamber B into a body to set it |
| I | close the door A |

For each of the part determined in the above procedure, the multi-media help information is formed. The multi-media help information is successively reproduced, the image information is displayed on the CRT 42A and the sound information is outputted from the speaker 42B, thereby notifying the operation guidance information to the operator so as to recover an error occurring in the mechanism 20A in the bank note depositing/paying apparatus 20.

Figure 11:
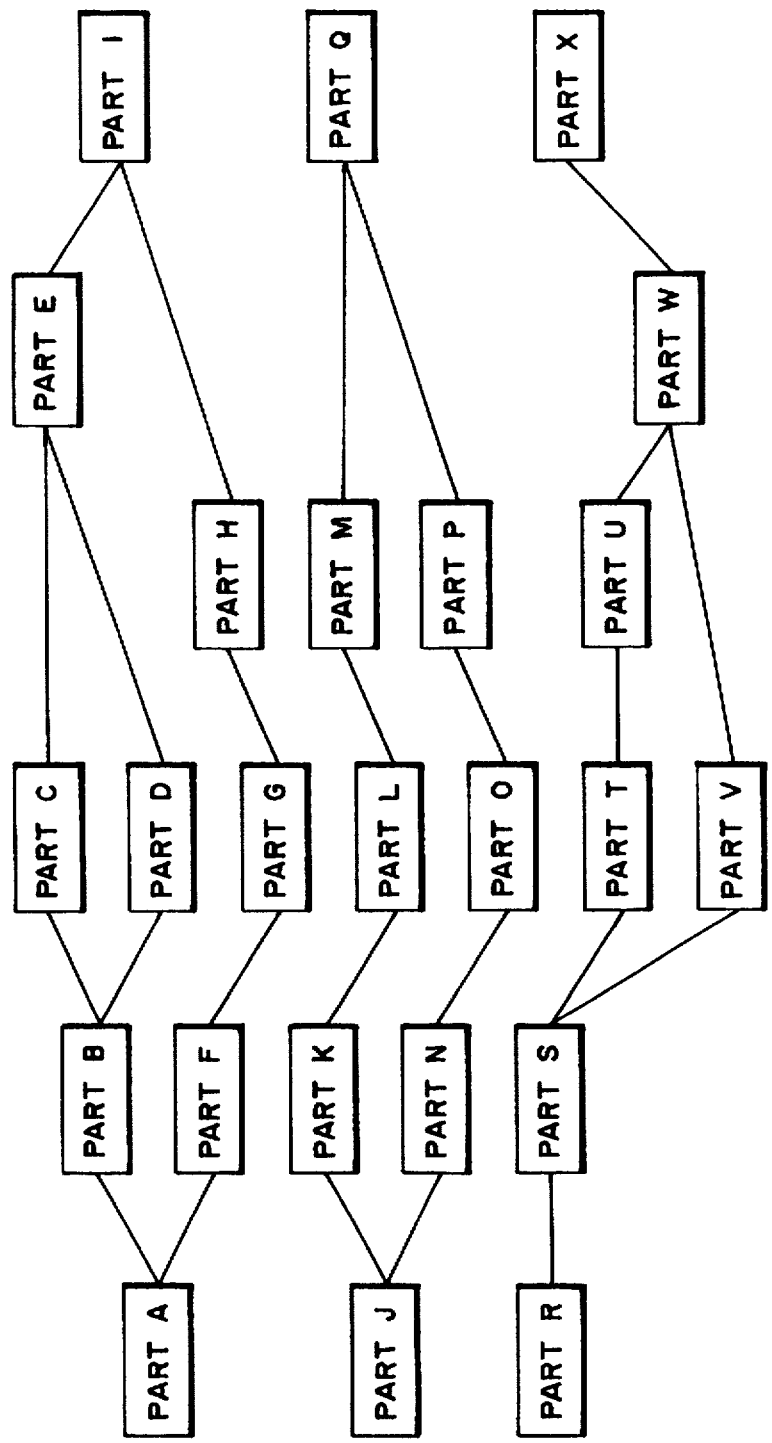
FIG. 11 shows a relation of part codes among them according to the first embodiment.

In FIG. 11, the part codes used for the error codes 00001 and 00002 include A, B, E and I commonly. Differences are only C and D. If the two errors occur simultaneously, it is desirable that operations of C and D are performed after operations of the part codes A and B, after that, operations of E and I are performed. According to this manner, it is unnecessary to repeat the operations A, B, E and I which are common operations so that the work becomes more effective. From this viewpoint, a priority of the part code for each of the error code is determined.

Figure 12:
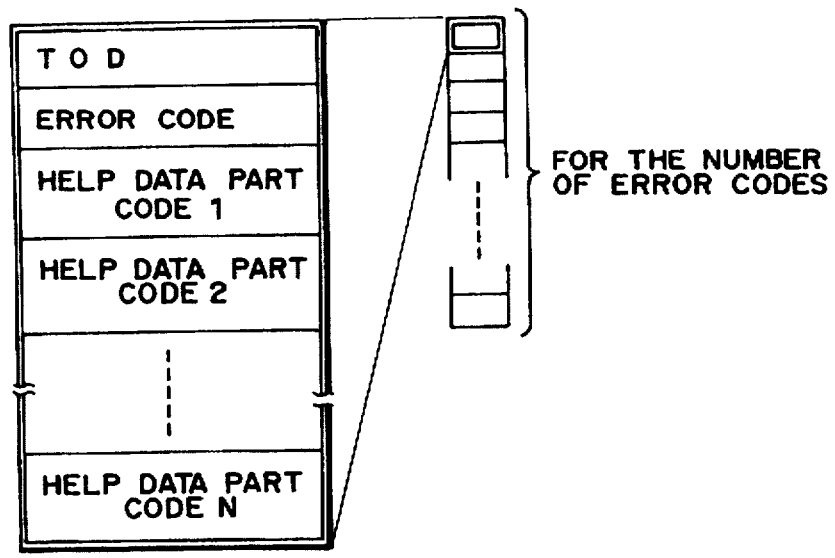
FIG. 12 shows a help data part table according to the first embodiment.
Figure 13:
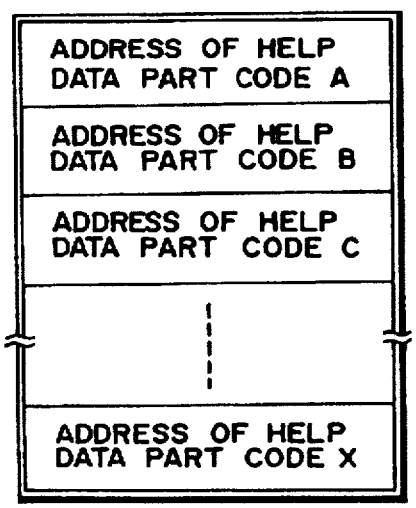
FIG. 13 shows an address converting table according to the first embodiment.

Data of image, sound or the like of the multi-media help information is stored in a large capacity storage apparatus (the database 43) such as a CD-ROM, a hard disk, etc. All the part codes of the multi-media help data corresponding to the error codes are stored in, for example, a help data part table, as shown in FIG. 12, in the error information storing unit 45. Incidentally, each of the help data part tables is in a variable length. At the head of the help data part table, TOD (Top Of Data) which is a key when the error information record control unit 44 searches for a position of each of the tables is attached. An address at which each of the help data parts exists is stored in an address converting table, for example, shown in FIG. 13, in the error information storing unit 45.

If errors of the error codes 00001 and 00002 occur simultaneously, the multi-media help control unit 47 searches for the data part table of the both error codes in the error information storing unit 45 through the error information record control unit 44, and checks necessary part codes.

The multi-media help control unit 47 sorts all part codes of the both error codes. If there are plural same part codes, only one is added to structural elements of the help information. Here, A, B, E and I which are common part codes between the both errors fall under it. Therefore, a part code sequence after the sort is "A→B→C→D→E→I".

The multi-media help control unit 47 searches for parts in the multi-media database 43 through the multi-media information search control unit 46 according to the order of reproduction while referring to the address of each part code in the address converting table in the error information storing unit 45, and controls to reproduce each part searched. As this, an error recovering operation guidance is reproduced, displayed and outputted by means of the multimedia. The operator takes measures to the mechanism 20A of the bank note depositing/paying apparatus 20 according to the operation guidance so that the error may be coped with most efficiently.

Figure 14:
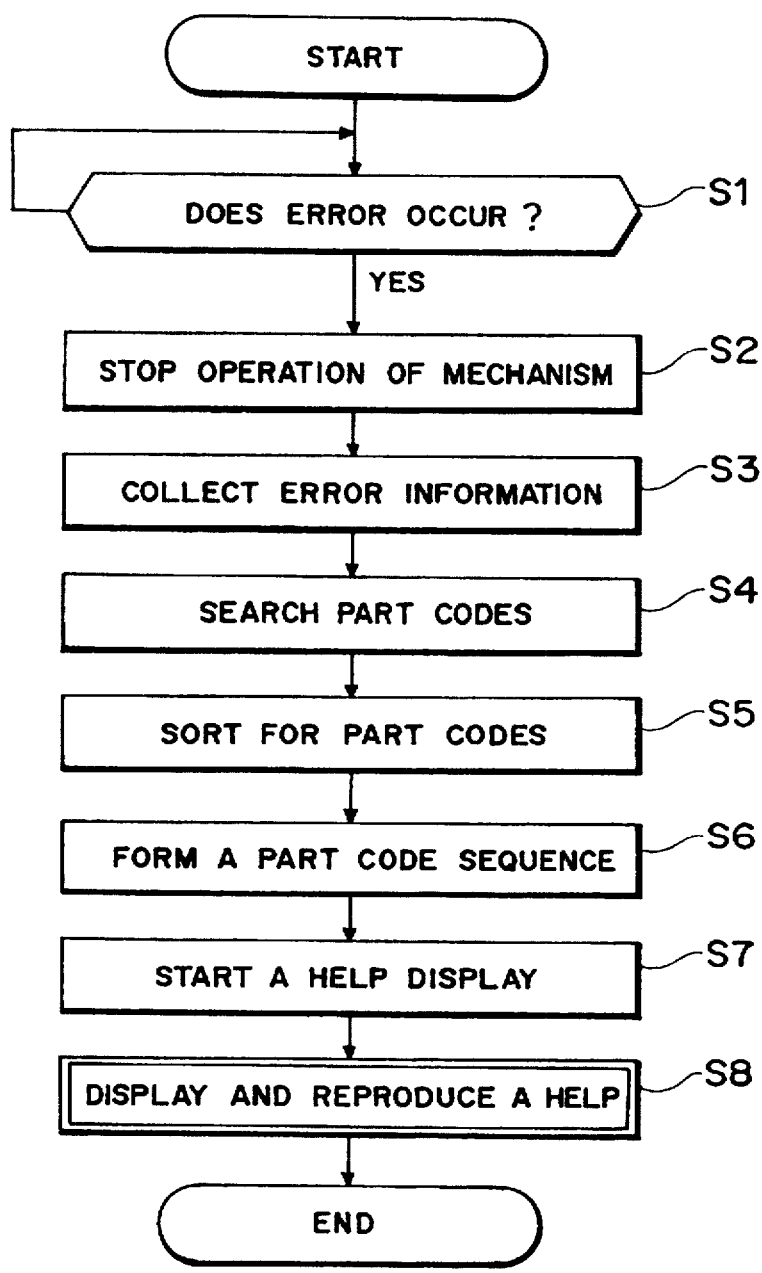
FIG. 14 is a flowchart illustrating an entire flow of a help information reproducing process according to the first embodiment.

An entire flow of a help information reproducing process by the apparatus of this embodiment will be next described with reference to FIG. 14 (Steps S1 through S8). In a business machine such as a bank note depositing/paying apparatus 20 made use at the window of the bank, a business screen is displayed on a display of the machine or a display of a terminal connected to the business machine (CRT 42A in this embodiment), in general.

As stated before, the bank note depositing/paying apparatus 20 has a number of optical and mechanical sensors 20B and 20C. On the basis of detecting signals fed from these sensors 20B and 20C, when the sensor control unit 20E detects an occurrence of an error in the mechanism 20A of the bank note depositing/paying apparatus 20 (YES judgement at Step S1), a mechanical operation of the bank note depositing/paying apparatus 20 is forced to stop (Step S2).

After that, error information such as a place where the error occurs, an error code, a condition of the mechanism 20A of the bank note depositing/paying apparatus 20, etc. is collected through the sensor control unit 20E. When the collected information is notified to the bank note depositing/paying apparatus control unit 20F, the bank note depositing/paying apparatus control unit 20F searches into the error information storing unit 20G on the basis of the collected information, and notifies a corresponding error code to the multi-media help control unit 47 (Step S3). If a plurality of errors occur simultaneously, information about these plural errors is collected, and a plural error codes are searched and notified. The multi-media help control unit 47 searches for the data part table of each of the error code in the error information storing unit 45 through the error information record control unit 44 on the basis of the notified error codes, and searches for and collects necessary part codes (Step S4).

The multi-media help control unit 47 sorts all the part codes collected (Step S5), unifies the included plural same part codes into one, and make a part code sequence (an order of part reproduction) (Step S6).

The multi-media help control unit 47 deduces an address on the database 43 in which necessary help data parts are stored on the basis of the unified part code sequence from the address converting table in the error information storing unit 45, searches for corresponding help data parts into the database 43 through the multi-media information search control unit 46, reproduces and displays the image information of the help information on the CRT 42A, and, at the same time, reproduces and outputs the sound information of the help information from the speaker 42B (Steps S7 and S8).

Next, a description will be made of a procedure of a process to realize the above-described first function (a function to reproduce the help information in linkage with a condition of the mechanism 20A) and the second function (a function to readily reproduce the help information depending on a level of the operator) of the multi-media help control unit 47 with reference to FIG. 15 and a flowchart shown in FIGS. 16 through 19 (Steps S11 through S50).

FIGS. 16 through 19 show a procedure of a control process carried out by the multi-media control unit 47 when errors of the error codes 00001 and 00002 occur simultaneously. In particular, FIG. 15 illustrates examples of hierarchical screen displayed depending on a level of the operator along a practical flow of the process.

Figure 15A:
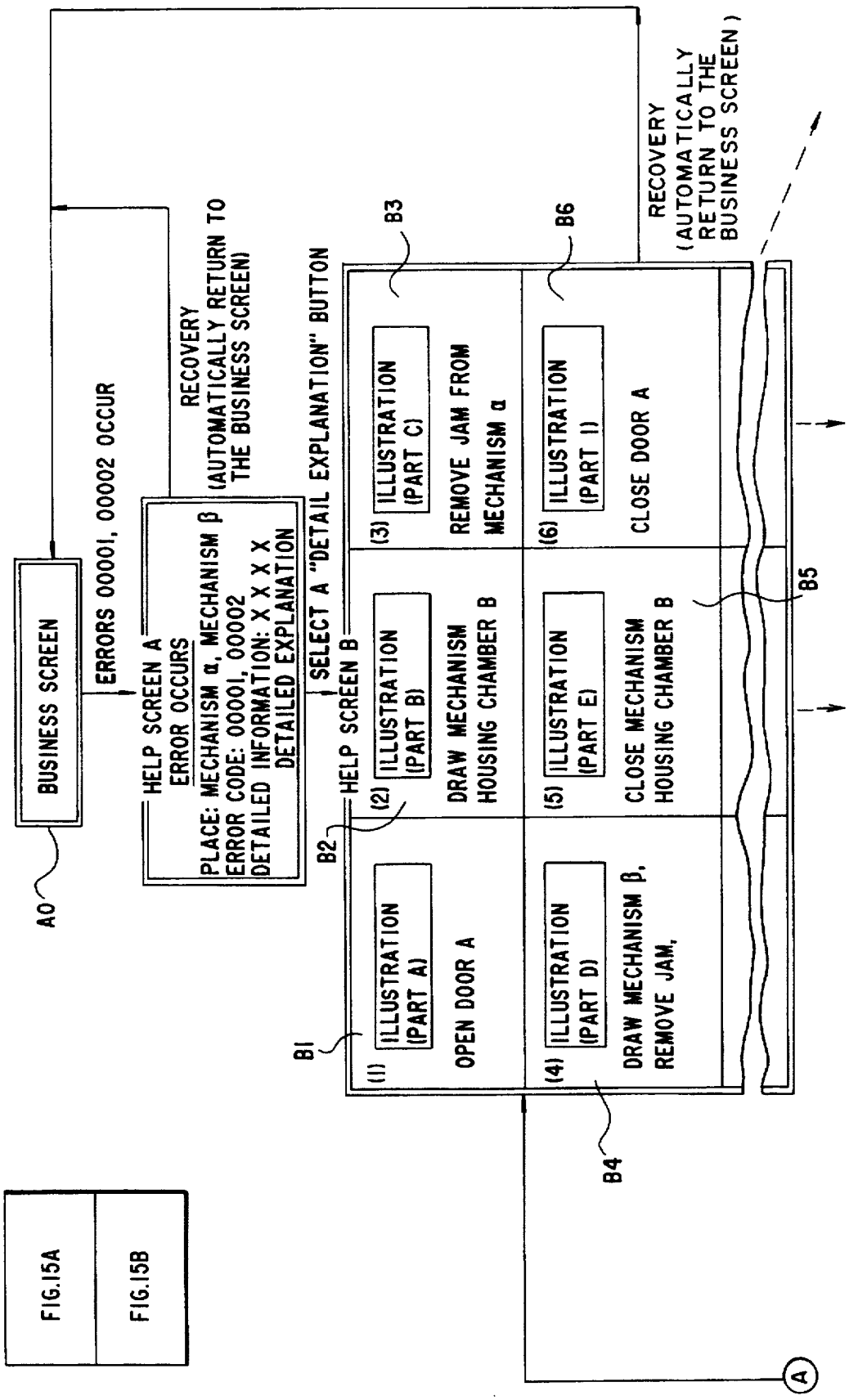
FIG. 15 is an illustration of an example of a hierarchical screen display according to a level of an operator along a flow of an actual process according to the first embodiment.
Figure 15B:
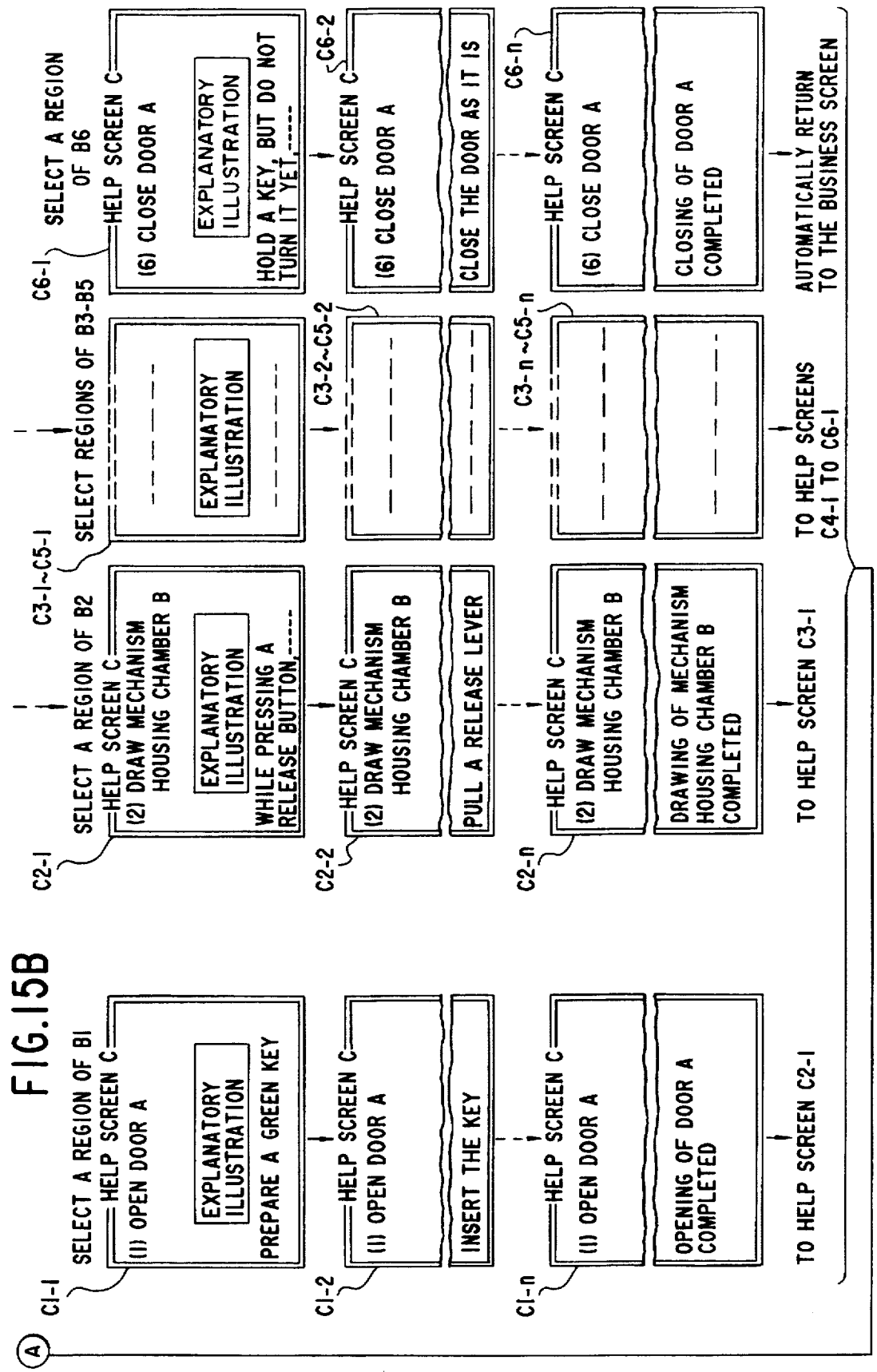
Figure 16:
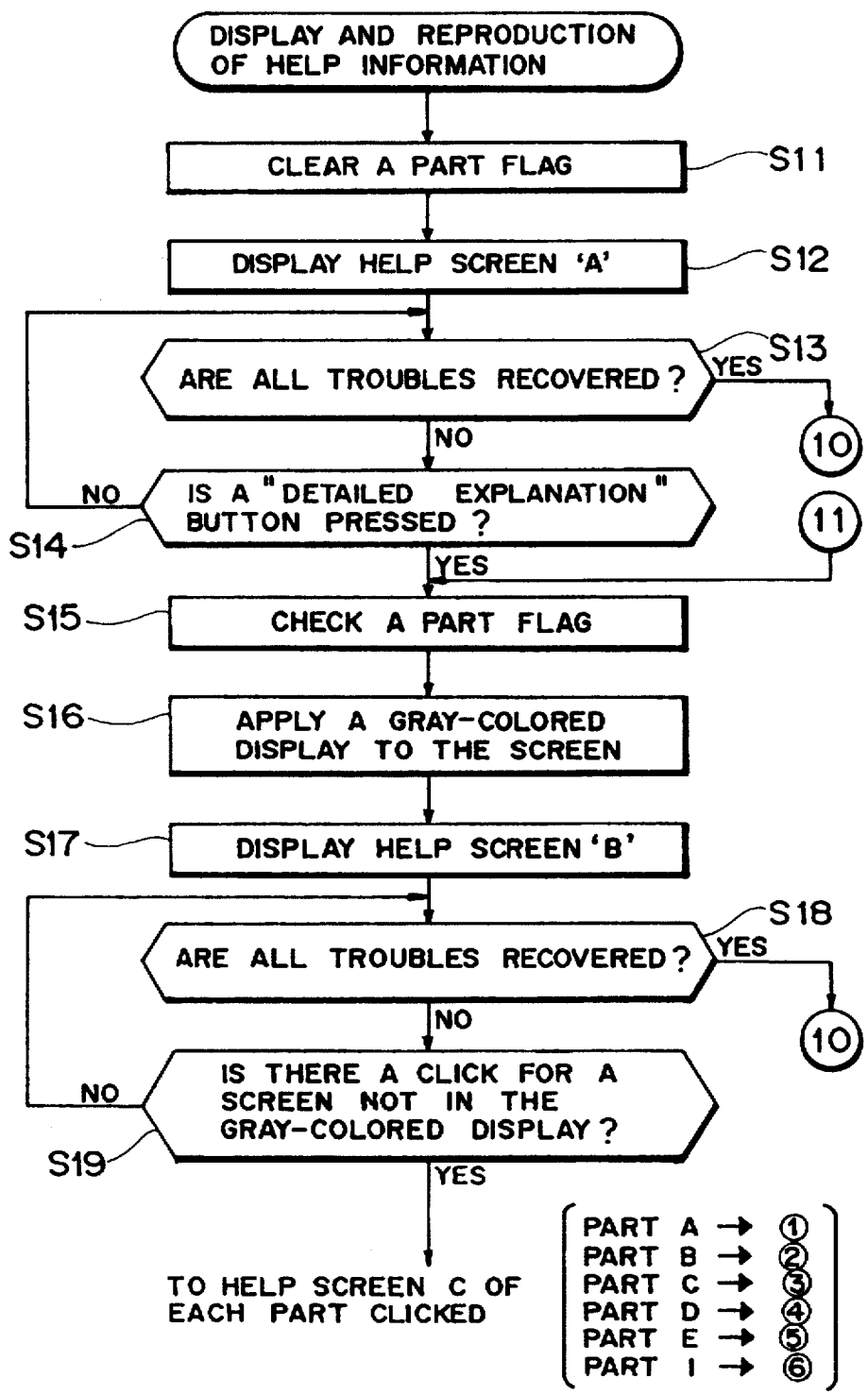

When an error occurs in the mechanism 20A in the bank note depositing/paying apparatus 20, a part flag in the storage 48 for flag is cleared (Step S11 in FIG. 16). As shown in FIG. 15, a help screen A is displayed from a business screen A0 on the CRT 42A (Step S12). On this screen A, a place of the occurrence of the error, an error code and detailed information are displayed. No multi-media help title is used here.

If the operator is in the senior level accustomed to coping with errors in the bank note depositing/paying apparatus 20, the operator can cope with the error appropriately only by a look at this help screen A, and recover the bank note depositing/paying apparatus 20. When the recovery is completed, the sensors 20B and 20C in the mechanism 20A detect the recovery (YES judgement at Step S13 in FIG. 16). Then, an expression such as "recovered" or the like is displayed on the screen (Step S49 in FIG. 19), and the display on the CRT 42A automatically returns to the business screen A0 (Step S50).

If the operator cannot cope with the error only by the help screen A, the operator clicks a display of "detailed explanation" on the CRT 42A through the mouse 40B or presses a detailed explanation button on the keyboard 40A (YES judgement at Step S14 in FIG. 16). In response to this operation, a part flag in the storage 48 is checked (Step S15), a screen of a part to which a flag is set is subjected to a special display process such as a gray-colored display or the like (Step S16), and a help screen B is displayed (Step S17).

Meanings of processes at Steps S15 and S16 will be described later. According to this embodiment, the help screen A is displayed in the event of an occurrence of an error, and a timer is simultaneously activated. If the timer detects that a condition where no recovery from a trouble or no request for "detailed explanation" is performed continues for a predetermined period or more, the processes at Steps S15 and S16 are automatically performed, then the help screen B is displayed at Step S17.

On the help screen B, illustrations (images) and texts (character information) showing a flow of a sequential work for recovering the present error are displayed, divided into plural small screens B1 through B6 in a lattice arrangement corresponding to respective work units (parts), displayed from the top left-hand toward the bottom right-hand in order of operation, an order of the display is determined according to the part code sequence having been determined as in the above manner in order to cope with the error most efficiently.

Each of the screens B1 through B6 is the same as the heading screen of each part constituting the multi-media help title. If the operator is in a middle level who is accustomed to coping with errors in the bank note depositing/paying apparatus 20, the operator can appropriately cope with the error only by a look at this help screen B, and recover a condition of the bank note depositing/paying apparatus 20. When the recovery is completed, the sensors 20B and 20C in the mechanism 20A detect the recovery (YES judgement at Step S18). An expression such as "recovered" is displayed on the screen (Step S49 in FIG. 19), then the display on the CRT 42A automatically return to the business screen A0 (Step S50).

If the operator cannot cope with the error only by referring to the help screen B, the operator selects a display screen of an operation that the operator does not know a manner of the operation by clicking through the mouse 40B on the CRT 42A (Step S19 in FIG. 16). This operation allows reproduction of each part of the multi-media help information.

The timer is activated at the same time the help screen B is displayed. If a condition where no recovery from the trouble and no selection of the small screens B1 through B6 is continued for a predetermined period or more (NO judgement at Steps S18 and S19), the procedure proceeds to a process to display the help screen at Step S20 in FIG. 17.

As shown in FIG. 15, if the part A (the help screen B1) is clicked, or if the timer detects an elapse of the predetemined period after the display of the help screen B, the procedure proceeds to Step S20 in FIG. 17, where more detailed help screens C1-1 through C1-n are successively displayed. Similarly, if the part B, C, D, E or I (any one of the help screens B2 through B6) is clicked, the procedure proceeds to Step S24 in FIG. 17, Step S28 in FIG. 18, Step 32 (S35) in FIG. 18, Step S41 in FIG. 19, or Step 45 in FIG. 19, where more detailed help screens C2-1 to C2-n; . . . ; and C6-1 to C6-n are successively displayed. These help screens C1-1 to C1-n; . . . ; and C6-1 to C6-n are collectively termed as a help screen C.

In this help screen C, an explanation of a manner to recover the error with dynamic images, static images, sounds, texts (character information), etc. If the operator is in a beginner level who touches the bank note depositing/paying apparatus 20 for the first time, the operator can appropriately and certainly cope with the error to recover the bank note depositing/paying apparatus 20 so long as the operator operates the bank note depositing/paying apparatus 20 while referring to the help screen C.

The dynamic images and static images displayed on the help screen C are a visualized procedure of an actual operation from a viewpoint of the operator looking at the bank note depositing/paying apparatus 20. These dynamic images and static images are displayed along with the character information (a text) illustrating an actual procedure of the operation. In simultaneous with a display of these, sounds are also outputted from the speaker 42B to explain the actual procedure of the operation.

The help screen C as above is successively changed to a screen showing an operation that should be performed next, while the multi-media help control unit 47 judges whether the operator has actually taken the measures on the basis of a result of detection (a condition of the mechanism 20A) by the sensors 20B and 20C in the mechanism 20A.

For instance, if the help screen B1 is selected (or, if a predetermined period has been elapsed after a display of the help screen B), the part A in the head of the part code sequence is reproduced, and the help screen C1-1 is displayed. The part A is the help information prompting an operation to open the door A in front of the apparatus. As shown in FIG. 15, actual image of each operation is successively displayed as help screens C1-1, C1-2 . . . along with character display (sound outputs) such as "prepare a green key", "insert the key" etc. (Step S20 in FIG. 17).

After the display of the part A, if the operator does not click twice the mouse 40B or press a predetermined key on the keyboard 40A (NO judgement at Step S21; detailed description of this operation will be made later), the procedure proceeds to the help display next to the part A. At that time, it is necessary to confirm that the door A is open. So, a detection signal from a door A sensor attached to the door A is checked to confirm the the door A is open (YES judgement at Step S22), then the next help display is performed.

More specifically, the operator opens the door A by referring to the help screen C1-1, C1-2, . . . When the door A sensor detects an open condition, a flag representing that a process in the part A is completed is set at NO in the storage 48 (Step S23), and a part B that is the next help information is reproduced (Step S24).

As above, once the operator selects the help screen C, the following C screens (each of the help data parts) are automatically reproduced and displayed at a reproducing timing that is automatically determined in linkage with the detection signals (a condition of the mechanism 20A) from the sensors 20B and 20C so long as the operator does not give an expression of interruption.

If the operator wants to interrupt the reproduction and display of the help screen C, the operator, for example, clicks the mouse 40B twice or presses a predetermined key on the keyboard 40A (YES judgement at Steps S21, S25 in FIG. 17, Steps S29, S33, S36 in FIG. 18, S42 or S46 in FIG. 19), a procedure returns to the help screen B at Step S17 where the procedure gets into a wait state for an input, after the processes at Steps S15 and S16 have been performed.

After that, a timing for reproduction of the help data parts is automatically determined in linkage with a result of detection (a condition of the mechanism 20A) by the sensors 20B and 20C, in the similar manner.

If the process in the part A is completed, or if the operator selects the help screen B2, the part B is reproduced, and the help screen C2-1 is displayed. The part B is help information prompting an operation to draw out the mechanism housing chamber B. So, actual images of operations are successively displayed as the help screens C2-1, C2-2, . . . along with character displays (sound outputs) such as "while pressing a release button . . . ", "pull a release lever", etc., as shown in FIG. 15 (Step S24).

After the display of the part B, if the operator does not click twice the mouse 40B or press a predetemined key on the keyboard 40A (NO judgement at Step S25), the procedure proceeds to the next help display of the part B. At that time, it is necessary to confirm that the mechanism housing chamber B has been drawn out. So, the detection signal from a mechanism housing chamber B sensor attached to the mechanism housing chamber B is checked to confirm that the mechanism housing chamber B has been drawn out (YES judgement at Step S26), then the next help is displayed.

More specifically, when the operator draws out the mechanism housing chamber B by referring to the help screens C2-1, C2-2, . . . and the mechanism housing chamber B sensor detects an open condition, a flag representing that the process of the part B has been completed is set at ON in the storage 48 (Step S27 in FIG. 18), then the part C that is the next help information is reproduced (Step S28).

When the process of the part B has been completed or if the operator selects the help screen B3, the part C is reproduced and the help screens C3-1, C3-2, . . . are successively displayed (Step S28), where the operator is prompted an operation to remove a note jam from the mechanism α above the mechanism housing chamber B as help information.

After the display of the part C, if the operator does not click twice the mouse 40B or press a predetermined key on the keyboard 40A (NO judgement at Step S29), the procedure proceeds to the next help display of the part C. At that time, it is necessary to confirm that the note jam has been removed. So, a detection signal from a mechanism α sensor attached to the mechanism α is checked to confirm that the note jam has been removed (YES judgement at Step S30), then the next help is displayed.

More specifically, when the operator removes the note jam from the mechanism α by referring to the help screens C3-1, C3-2, . . . and the mechanism a sensor detects "removal of jam", a flag representing that the process of the part C has been completed is set at ON in the storage 48 (Step S31), then reproduction of the part D that is the next help information is performed (Step S32).

According to this embodiment, in the part D, three operations that are "draw out the mechanism β from the mechanism housing chamber B, remove a note jam, and push the mechanism β into the mechanism housing chamber B to set it" are dealt as one part. A meaning of this is that it is necessary to perform these three operations successively, and there is no meaning if this part is divided into different parts. For the sake of easy understanding of the operation, contents of help data of the part D is divided into two parts D-1 and D-2 in this embodiment.

Accordingly, if the process of the part C has been completed or when the operator selects the help screen B4, the part D-1 is first reproduced (Step S32), where the operator is prompted an operation to draw the mechanism β from the mechanism housing chamber B as help information.

After the display of the part D-1, if the operator does not click twice the mouse 40B or press a predetermined key on the keyboard 40A (NO judgement at Step S33), the procedure proceeds to the next help display of a part D-2. At that time, it is necessary to confirm that the mechanism β has been drawn out. So, a detection signal from a mechanism β sensor attached to the mechanism housing chamber B is checked to confirm that the mechanism β has been drawn out (YES judgement at Step S34), then display and reproduction of the second part D-2 is performed (Step S35).

On the display of the part D-2, the operator is prompted an operation to remove the note jam from the mechanism β and set the mechanism β in the mechanism housing chamber B as help information. After the display of the part D-2, if the operator does not click twice the mouse 40B or press a predetermined key on the keyboard 40A (NO judgement at Step S36), a confirmation as to whether the operation corresponding to the display of the part D-2 has been certainly performed or not is made (Steps S37 and S38), as described next.

Since the mechanism β does not operate normally if the mechanism β is not set correctly in the mechanism housing chamber B, a detection signal from the mechanism β is first checked to confirm that the mechanism β is set in the mechanism housing chamber B (YES judgement at Step S37). Then, a detection signal from the mechanism β sensor is checked to confirm that the not jam has been removed (Step S38).

If the note jam has not been certainly removed from the mechanism β (NO judgement at Step S38), a part Z of contents such as "jam has not been removed, try once more" or the like is reproduced and displayed (Step S39). After that, the procedure returns to Step S32 where the contents of D-1 is again reproduced.

Figure 19:
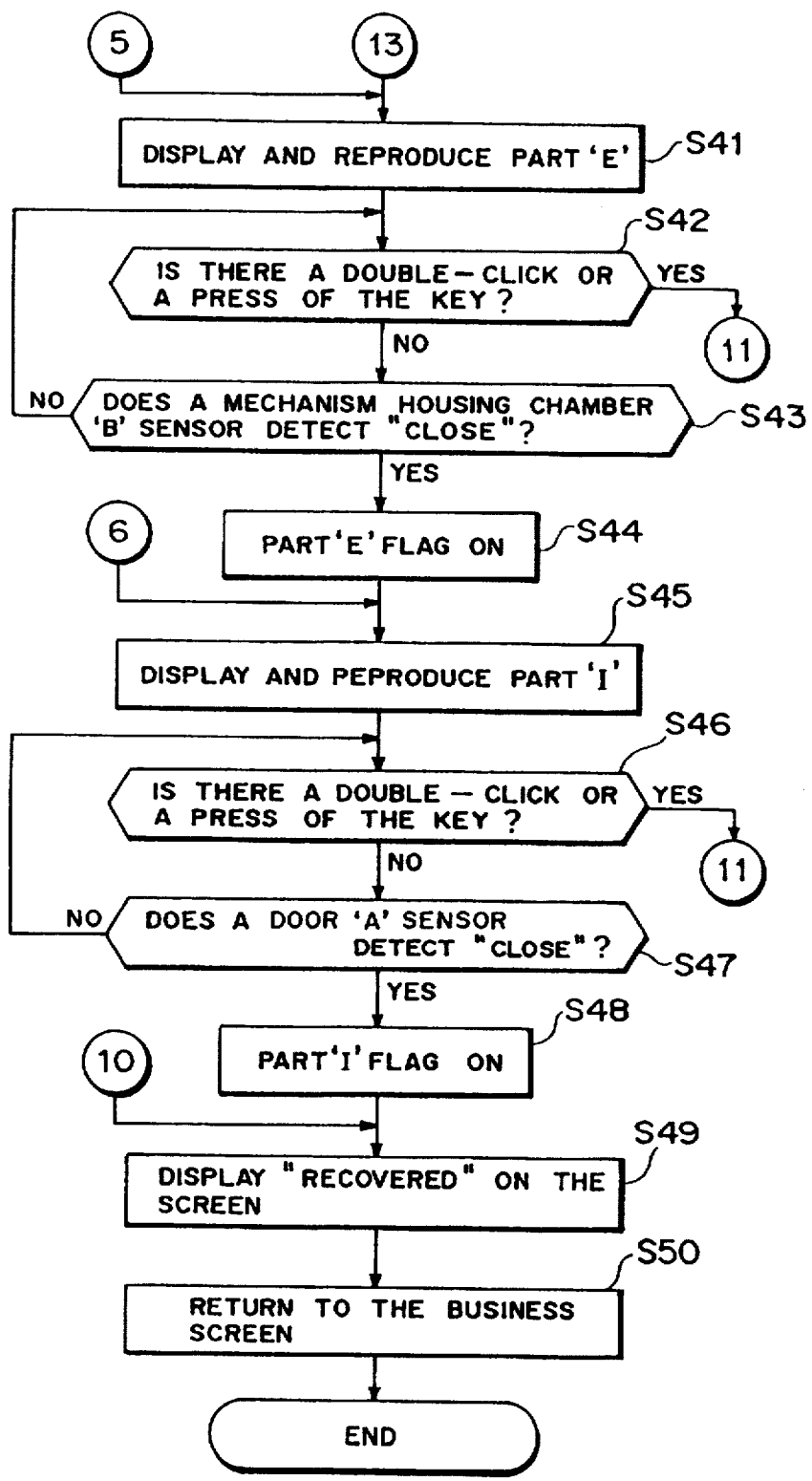

As above, after a confirmation that the note jam has been certainly removed (YES judgement at Step S38), a flag representing that the process of the part D has been completed is set at ON in the storage 48 (Step S40), then a part E that is the next help information is reproduced (Step S41 in FIG. 19).

When the process of the part D has been completed or if the operator selects the help screen B5, the part E is reproduced and the help screens C5-1, C5-2, . . . are successively displayed (Step S41), where the operator is prompted an operation to push the mechanism housing chamber B into the body as help information.

After the display of the part E, if the operator does not click twice the mouse 40B or press a predetermined key on the keyboard 40A (NO judgement at Step S42), the procedure proceeds to the next help display of the part E. At that time, it is necessary to confirm that the mechanism housing chamber B has been pushed into the body. So, a detection signal from the mechanism housing chamber B sensor is checked to conform that the mechanism housing chamber B has been pushed into the body (YES judgement at Step S43), after that, the next help is displayed.

More specifically, when the operator pushes the mechanism housing chamber B into the body by referring to the help screens C5-1, C5-2, . . . and the mechanism housing chamber B sensor detects a close state, a flag representing that the process of the part E has been completed is set at ON in the storage 48 (Step S44), then the part I that is the last help information is reproduced (Step S45).

If the process of the part E has been finished or if the operator selects the help screen B6, the part I is reproduced and the help screens C6-1, C6-2, . . . are successively displayed. The part I is help information prompting the operator to close the door A in front of the apparatus. As shown in FIG. 15, actual images of the operations are successively displayed along with character displays (sound outputs) such as "not turn the key but wait . . . ", "close the door as it is", etc. (Step S45).

After the display of the part I, if the operator does not click twice the mouse 40B or press a predetermined key on the keyboard 40A (NO judgement at Step S46), the help guidance is finished. At that time, it is necessary to confirm that the door A is closed. So, a detection signal from the door A sensor is checked to confirm that the door A is closed (YES judgement at Step S47), then the help guidance is terminated.

More specifically, when the operator closes the door A by referring to the help screens C6-1, C6-2, . . . and the door A sensor detects a close condition, a flag representing that the process of the part I has been completed is set at ON in the storage 48 (Step S48), then a display such as "recovered" or the like is performed on the screen (Step S49), then the display on the CRT 42A automatically returns to the business screen A0 (Step S50).

In terms of the screens B1 through B6 through which the operator actually worked, predetermined flags in the storage 48 are set at ON. If the reproduction and display of the help screen C is interrupted and the help screen B is displayed, this flag is referred (Step S15 in FIG. 16), and the small screens (B1 through B6) labeled the ON flags are automatically subjected to a special display process such as a gray-colored display (Step S16). Whereby, the operator can clearly recognize the work having been finished, besides the operator cannot select again the small screen in gray.

As stated above, even if the help screen A or B is displayed, when the measures to the error in the bank note depositing/paying apparatus 20 is completed and the error is recovered, the sensor control unit 20E of the bank note depositing/paying apparatus 20 detects recovery from the error (YES judgement at Steps S13 and S18 in FIG. 16), a message such as "error recovered" or the like is displayed on the help screen A or B presently displayed (Step S49 in FIG. 19), the help screen A or B is erased from the CRT 42A, and the display on the CRT 42A automatically returns to the business screen A0 (Step S50).

According to the first embodiment of this invention, the apparatus itself detects a necessity for recovery from error or medium supplement as above, and reproduction of the help guidance is automatically proceeded in synchronization with this so that it is possible to use automatically the help information without bothering the operator and increase the operation efficiency.

The function of the operation guidance information reproducing apparatus of this embodiment is provided to the terminal apparatus as stated before. However, the terminal apparatus is installed from the beginning for managing the bank note depositing/paying apparatus 20. It is therefore unnecessary to newly provide an apparatus used to reproduce the detailed operation guidance information. It is therefore possible to realize accurate reproduction of the operation procedures at a low cost.

Further, it is possible to display and reproduce the help information, from a simple help explanation for the upper level operator down to the help information for the middle and lower level operator, stepwisely depending on an operator's demand. It is therefore possible to provide the help information of contents in various levels meeting operators in all levels without forcing inefficient works to the operator. The operator can operate only by efficiently watching and listening only necessary information.

Still further, this operation guidance is so programmed as to avoid duplication of the same process if a plurality of errors or a necessity of medium supplement occurs, and to enable each user to customize the order of process. Accordingly, it is possible to display the help screens B and C in the most efficient order.

Still further, the actual operation procedure is visualized from a viewpoint of the operator looking at the bank note depositing/paying apparatus 20 and the obtained imaged are reproduced and displayed on the help screen C, besides the character information and the sound information are reproduced simultaneously so that the multi-media function is effectively used. The operator can thereby surely grasp the operation procedure visually and aurally. In consequence, it is possible to notify contents of the operation quite comprehensively to the operator.

The above embodiment has been described by way of an example where an apparatus that is an object of the operation guidance is a bank note depositing/paying apparatus. This invention is not limited to this example, but applicable to another business machine, similarly. In which case, the present invention may bring the same function and effect as the above embodiment.

In the above-described embodiment, the operation guidance is performed when an error or a necessity of medium supplement occurs. It is also possible to guide the operation whenever the operator (the user) comes to need the operation guidance with or without a trouble in the similar manner to the above embodiment.

In the above-described embodiment, a level of the operator is categorized into three levels of senior, middle and beginner, and the operation guidance is displayed in three stages depending on each level. This invention is not limited to this example, but the operation guidance may be displayed hierarchically in two stages, or four stages or more.

(C) Description of Second Embodiment

Figure 20:
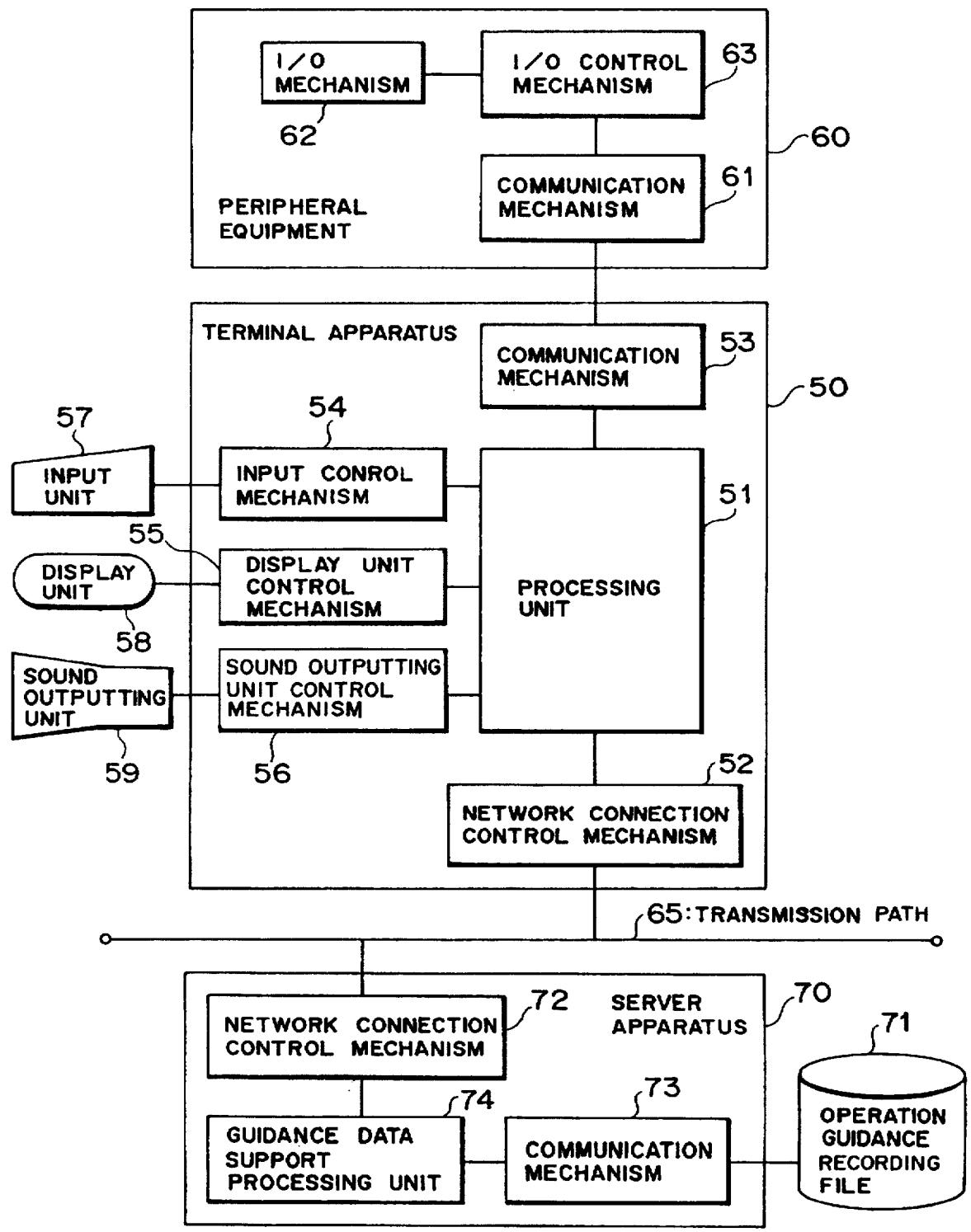
FIG. 20 is a block diagram of an operation guidance information reproducing apparatus according to a second embodiment of this invention.

FIG. 20 is a block diagram showing a structure of a system having an operation guidance information reproducing apparatus as a second embodiment of this invention. In the second embodiment shown in FIG. 20, a terminal apparatus (a work station) 50 has substantially the same function as the operation guidance information reproducing apparatus having been described in the first embodiment. The terminal apparatus 50 manages peripheral equipment (an object apparatus) 60. When an event such as an error occurs in the peripheral equipment 60, an operation guidance (an operation guidance information) depending on the event is reproduced at the terminal apparatus 50.

According to the second embodiment, the terminal apparatus 50 is connected to a server apparatus (an upper apparatus; another terminal apparatus, an inquiry computer, etc.) via a transmission line 65 configuring a network such as a LAN. The terminal apparatus 50 is provided information about an operation guidance to be reproduced and displayed from an operation guidance storing file (a database) 71 connected to the server apparatus 70.

As shown in FIG. 20, the terminal apparatus 50 of this embodiment has a processing unit 51, a network connection control mechanism 52, a communication mechanism 53, an input unit control mechanism 54, a display unit control mechanism 55 and a sound output unit control mechanism 56.

The processing unit 51 has accesses for transmission with the LAN (the transmission path 65) through the network connection mechanism 52, manages the peripheral equipment 60 through the communication mechanism 53. In addition to these, the processing unit 51 has substantially the same functions as the multi-media help control unit 47 having been described in the first embodiment.

The input unit control mechanism 54, the display unit control mechanism 55 and the sound output unit control mechanism 56 are interfaces between the input unit 57, the display unit 58 and the sound outputting unit 59 all connected to the terminal apparatus 50, and the processing unit 51, respectively.

The input unit 57 is configured with, for example, a mouse, a keyboard, etc., used for inputting an instruction from an operator. The display unit 58 reproduces and displays operation guidance information in dynamic images, static images, characters, etc. on a display such as a CRT or the like. The sound outputting unit 59 is configured with, for example, a speaker, used for reproducing and outputting the operation guidance information with sound.

The peripheral equipment 60 of this embodiment has a communication mechanism 61, an I/O mechanism 62 and an I/O control mechanism 63. The communication mechanism 61 is an interface with the terminal apparatus 50. The I/O mechanism 62 detects detailed conditions (an operation condition, an error, etc.) in the peripheral equipment 60. The I/O control mechanism 63 notifies detailed information in the equipment 60 detected by the I/O mechanism 62 to the terminal apparatus 50 via the communication mechanism 61.

The server apparatus 70 of this embodiment has a network connection control mechanism 72, a communication mechanism 73 and a guidance data support processing unit 74. The network connection control mechanism 72 is an interface between the LAN (the transmission path 65) and the guidance data support processing unit 74. The communication mechanism 73 is an interface between the operation guidance recording file 71 and the guidance data support processing unit 74.

When the guidance data support processing unit (a search path) 74 receives a request to read operation guidance from the terminal apparatus 50 via the transmission line 65 and the connection mechanism 72, the guidance data support processing unit 74 searches into the operation guidance recording file 71 via the communication mechanism 73, reads the requested operation guidance information, and transfers it to the terminal apparatus 50 via the connection mechanism 72 and the transmission path 65.

The operation guidance recording file 71 is an external storage apparatus such as a hard disk or the like, in which data such as images, sounds, etc. to be reproduced at the terminal apparatus 50 as the operation guidance information are stored in advance. In particular, the image data is formed by photographing an actual manner of an operation from a viewpoint of the operation looking at the peripheral equipment 60.

The processing unit (a reproduction control unit) 51 receives a condition of the peripheral equipment 60 (detected by the I/O mechanism 62) changing with a progress of measures taken by the operator from the peripheral equipment 60, receives an operation guidance depending of a progress of the operation in linkage with a condition of the peripheral equipment 60 from the operation guidance recording file 71, and controls the display unit 58 and the sound outputting unit 59 to sequentially reproduce it.

Figure 21:
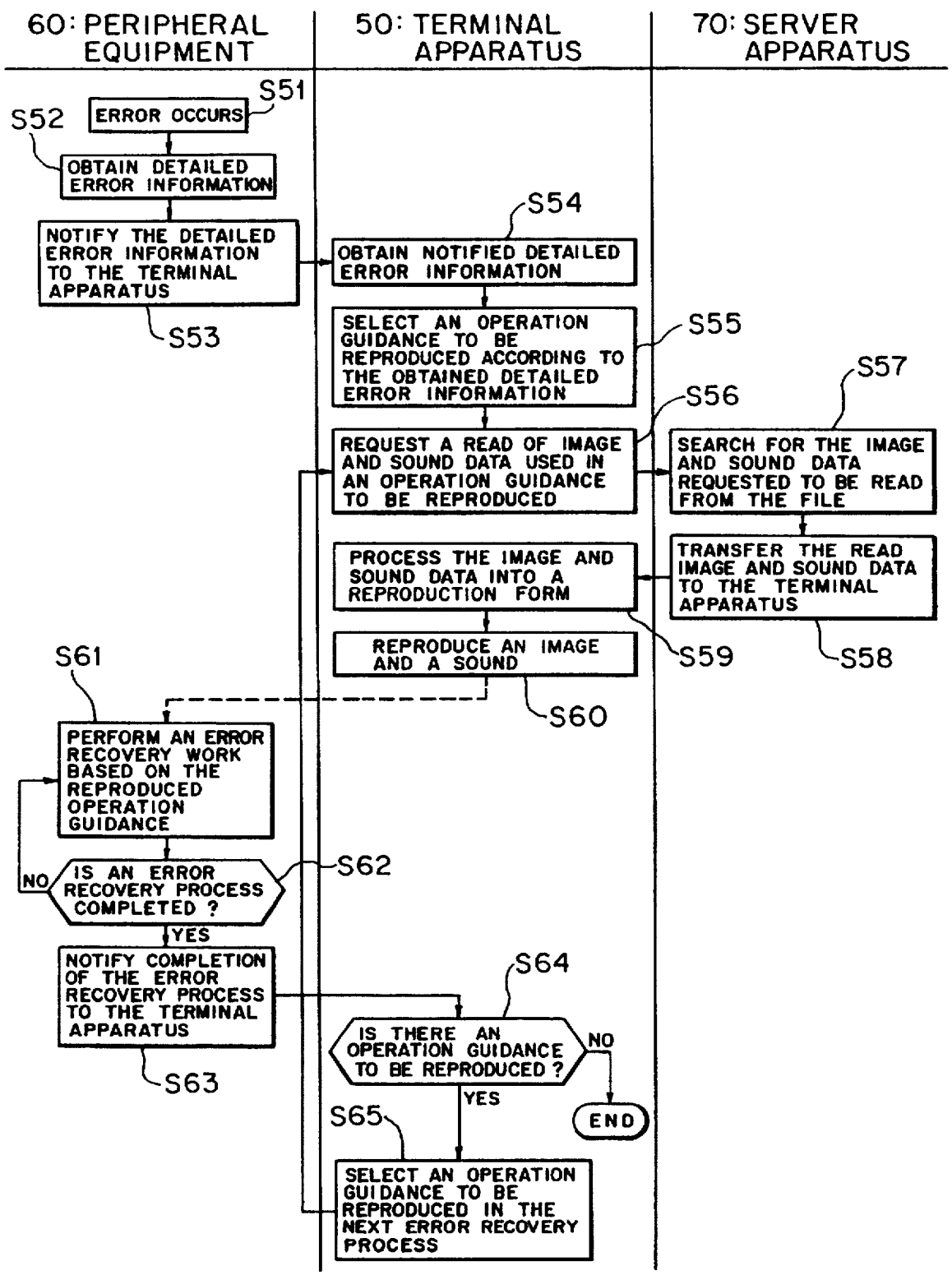
FIG. 21 is a flowchart illustrating an operation of the second embodiment.

An operation of the apparatus according to the second embodiment having the above structure will be next described with reference to a flowchart (Steps S51 through S65) shown in FIG. 21.

When any trouble occurs in the peripheral equipment 60 (Step S51), the I/O mechanism 62 detects the trouble and acquires detailed error information (Step S52). The detailed error information so obtained is notified to the terminal apparatus 50 via the I/O control mechanism 63 and the communication mechanism 61 (Step S53).

When the processing unit 51 of the terminal apparatus 50 acquires the detailed error information through the communication mechanism 53 (Step S54), the processing unit 51 selects an operation guidance to be reproduced on the basis of that detailed error information (Step S55), and requests the server apparatus 70 via the transmission path 65 to read data of images and sounds to be reproduced in the selected operation guidance (Step S56).

When receiving a request from the terminal apparatus 50, the guidance data support processing unit 74 of the server apparatus 70 searches into the operation guidance recording file 71 through the communication mechanism 73, reads out operation guidance information requested to be read (Step S57), and transfers it to the terminal apparatus 50 through the connection mechanism 72 and the transmission path 65 (Step S58).

When receiving the operation guidance information from the server apparatus 70, the processing unit 51 of the terminal apparatus 50 processes image data and the sound data included in the received operation guidance information to obtain data in a form that can be actually reproduced (Step S59), sends it to the display unit 58 and the sound outputting unit 59 through the display unit control mechanism 55 and the sound output unit control mechanism 56 to reproduce and display the operation guidance information as images on the display unit 58, besides reproducing and outputting the operation guidance information as sounds through the sound outputting unit 59 (step S60).

The user performs a recovery work or the like on the peripheral equipment 60 by referring to the operation guidance reproduced at the display unit 58 and the sound outputting unit 59 (Step S61).

When the recovery work in the part of the reproduced operation guidance is completed (YES judgement at Step S62), the I/O mechanism 62 detects the condition, and notifies completion of the error recovery process to the terminal apparatus 50 via the I/O control mechanism 63 and the communication mechanism 61 (Step S63). If a notification of completion of the recovery work in the part of the reproduced operation guidance is not transmitted from the peripheral equipment 60 for a predetermined period or more, the processing unit 51 of the terminal apparatus 50 reproduces again the same operation guidance.

When receiving the notification of completion of the recovery work in the part of the reproduced operation guidance, the processing unit 51 of the terminal apparatus 50 judges a presence of the operation guidance to be reproduced next (Step S64). If there is no operation guidance to be reproduced next, that is, all recovery works have been completed, a reproduction controlling process by the processing unit 51 is terminated. If the recovery process is in the course, an operation guidance to be reproduced in the next error recovery process is selected again (Step S65), and the processes at Steps S56 through S63 above-described are repeated.

Likewise, the user repeats the recovery work on the peripheral equipment 60 by referring to the operation guidance reproduced at the display unit 58 and the sound outputting unit 59, and restores the peripheral equipment to the normal condition.

As above, the terminal apparatus 50 reproduces the operation guidance information in linkage with a condition of the peripheral equipment 60 so as to assist the operator who actually perform the recovery work on the peripheral equipment 60.

When the operator needs the operation guidance, the operator inputs information indicating that the operation guidance is necessary through the input unit 57. The inputted information is notified to the processing unit 51 via the input control mechanism 54. The processing unit 51 receiving this information causes the display unit 58 through the display unit control mechanism 55 to display a selection screen for inquiring of the operator which operation guidance the operator wants.

The operator selects and designates the necessary operation guidance through the input unit 57 by referring to the selection screen displayed on the display unit 58. Information about the selected operation guidance is notified to the processing unit 51 through the input unit control mechanism 54. The processing unit 51 selects the operation guidance to be reproduced on the basis of the notified information about the operation guidance, and asks the server apparatus 70 via the transmission path 65 to read image and sound data to be reproduced in the operation guidance. After that, the operation guidance required by the operator is reproduced at the display unit 58 and the sound outputting unit 59 in a manner similar to the above manner having been described with reference to FIG. 21.

According to the second embodiment of this invention, information about a condition of recovery is notified from the peripheral equipment 60 to the terminal apparatus 50 whenever the recovery operation is performed on the peripheral equipment 60, and an operation guidance depending on a condition of the recovery (that is, a stage of the recovery operation) is reproduced on the terminal apparatus 50. As this, necessary operation guidance is automatically reproduced without a necessity of a particular instruction from the user through the mouse or the like so that the operation efficiency may be largely improved.

An actual operation procedure is visualized from a viewpoint of the operator looking at the peripheral equipment 60, and reproduced and displayed so that it is possible to notify contents of the operation to the operator quite comprehensibly.

A client/server system is configured with a LAN or the like, data of images and sounds about the operation guidance are collectively recorded in the operation guidance recording file 71 connected to the server apparatus 70 so as to be commonly used by each of the apparatus. It is therefore possible to save a material for the disk of the terminal apparatus (a work station) 50, and reduce a traffic on the communication paths between the terminal apparatus.

(D) Description of Third Embodiment

Figure 22:
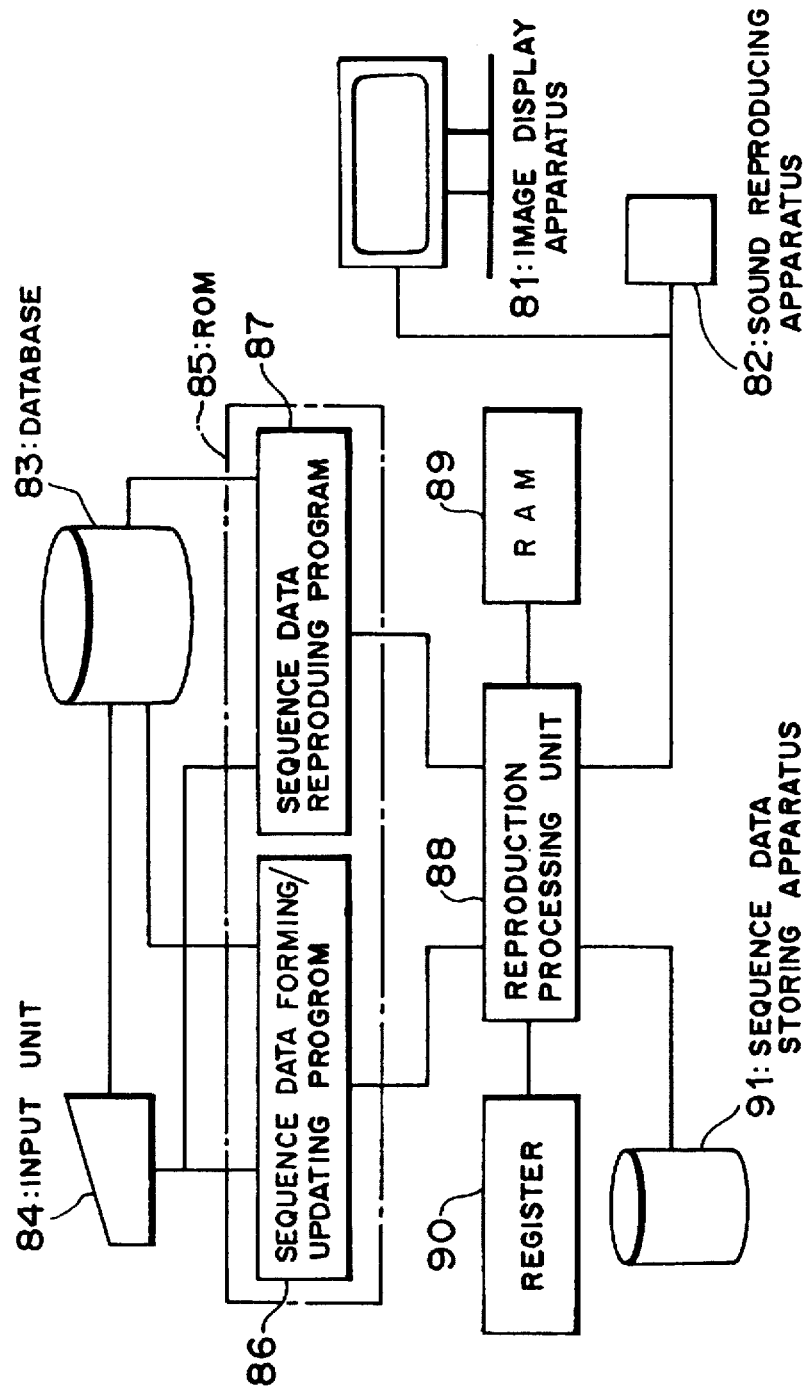
FIG. 22 is a block diagram showing a structure of a multi-media information reproducing apparatus according to a third embodiment of this invention.

FIG. 22 is a block diagram showing a structure of a multi-media information reproducing apparatus according to a third embodiment of this invention. The first embodiment has been described by way of an example where data to be reproduced is deassembled into parts and stored, necessary parts are searched and combined, and an operation guidance information is formed suitably. In the apparatus of the third embodiment, voluntary multi-media information is deassembled into parts as above and the user combines the parts to form a voluntary multi-media title.

In FIG. 22, reference numerals 81 and 82 denote an image display apparatus (a display unit) and a sound reproducing apparatus (a sound output unit) for reproducing multi-media information including image information and sound information, respectively.

Reference numeral 83 denotes a database. The database 83 is used to store in advance the multi-media information in the form of parts, each of which is a unit according to contents of the information.

Figure 23:
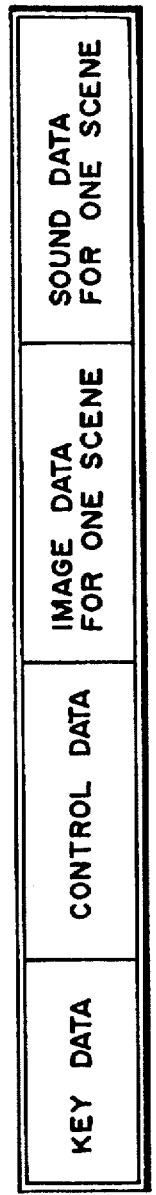
FIG. 23 shows a configuration of a multi-media part according to the third embodiment.

According to this embodiment, the multi-media parts are configured as, for example, shown in FIG. 23. In each of the multi-media parts, a unique number with which a part can be specified is stored as key data, along with image data for one scene and sound data for one scene. Further, in each of the multi-media parts, addresses of the image data and the sound data in that part, a length of that part, control information (information used for a special effect, etc.) for reproduction of the image data and the sound data are stored as control data.

Figures 24, 25:
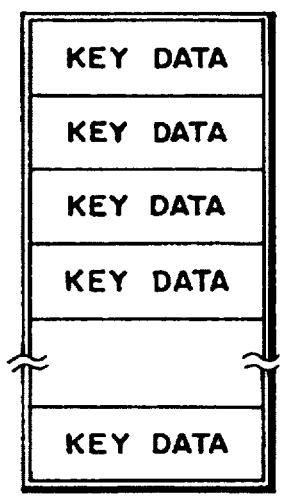
FIG. 24 shows a configuration of a multi-media database according to the third embodiment.
FIG. 25 shows a configuration of a sequence data file according to the third embodiment.

The data base 83 is configured with a gathering of a number of the multi-media parts as shown in FIG. 24. Only by storing the key data in the head of each multi-media data part is stored in order in a storage medium (a sequence data storing apparatus 91 described later), an address of the multi-media information and an order of reproduction may be designated. The key data which has been stored in the storage medium and formed into a file is termed as a sequence data file, having a structure as, for example, shown in FIG. 25.

In FIG. 22, reference numeral 84 denotes an input unit such as a mouse, a keyboard, etc. used by a user to input necessary instructions to reproduce the multi-media parts in the database 83. Reference numeral 85 denotes a ROM for storing a sequence data forming/updating program (a sequence data forming means) 86 and a sequence data reproducing program (a sequence data reproducing means) 87 therein.

The programs 86 and 87 stored in the ROM 85 operate on a CPU not shown actually. The sequence data forming/updating program 86 operates according to a flowchart described later with reference to FIGS. 27 through 31. In order to determine an order of reproduction of plural arbitrary multi-media data parts in the database 83 according to an instruction through the input unit 84, the sequence data forming/updating program 86 forms a sequence data file made up of key data designating each multi-media part, and sets and stores it into the sequence data storing apparatus 91.

The sequence data reproducing program 87 operates according to a flowchart described later with reference to FIG. 32. When receiving an instruction to start reproducing multi-media parts through the input unit 84, the sequence data reproducing program 87 reads plural multi-media parts from the database 83 according to the sequence data file having been formed by the sequence data forming/updating program 86 and stored in the sequence data storing apparatus 91, and causes a reproduction processing unit to successively reproduce these plural multi-media parts at the image display apparatus 81 and the sound reproducing apparatus 82.

Reference numeral 88 denotes a reproduction processing unit. The reproduction processing unit 88 has functions to process various information notified from the sequence data forming/updating program 86 or the sequence data reproducing program 87, form image data and sound data, transmit these image data and sound data to the image display apparatus 81 and the sound reproducing apparatus 82 to reproduce them. In addition to these, the reproduction processing unit 88 has a function to get an access to the sequence data storing apparatus 91 to write or read the sequence data file.

Reference numeral 89 denotes a RAM, and 90 denotes a register. The RAM 89 and the register 90 are used when the reproduction processing unit 88 performs a process, and adapted to store various data temporarily therein.

An operation of the above-mentioned apparatus according to the third embodiment having the above structure will be next described referring to FIGS. 26 through 33.

Figure 26:
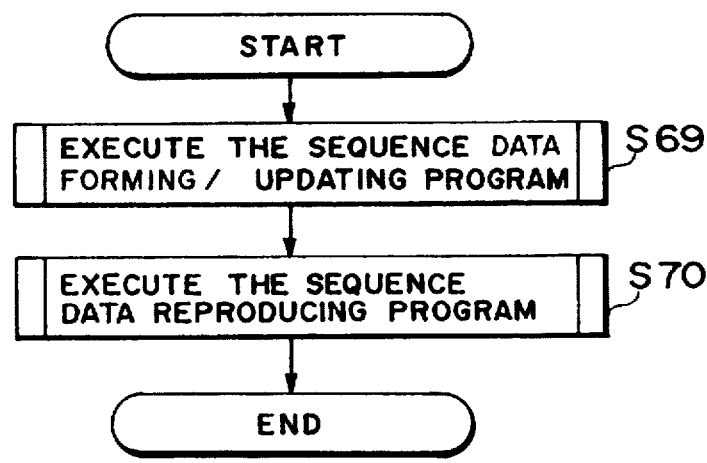
FIG. 26 is a flowchart illustrating an operation of the third embodiment.

According to this embodiment, processes by each program are, in general, carried out in order of process by the sequence data forming/updating program 86 (Step S69), and a process by the sequence data reproducing program 87 (Step S70), as shown in FIG. 26.

Figure 27:
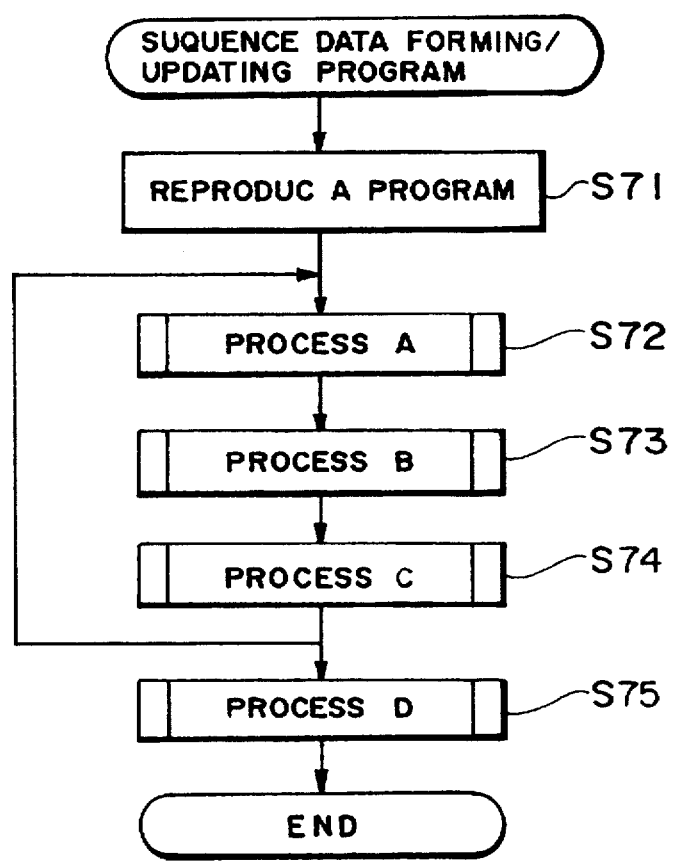
FIGS. 27 through 32 are flowcharts illustrating an operation of the third embodiment.

A scenario of the sequence data forming/updating program 86 develops as shown in FIG. 27. According to this scenario, a program which prompts the user to select a voluntary multi-media part is reproduced (Step S71), and a process A (Step S72; refer to FIG. 28), a process B (Step S73; refer to FIG. 29) and a process C (Step S74; refer to FIG. 30) are continuously carried out. Until inputs of a sequence of data parts finishes, these processes A, B and C are repeated. After that, a process D (Step S75; refer to FIG. 31) is carried out, and a process by the sequence data forming/updating program 86 is terminated.

Figure 28:
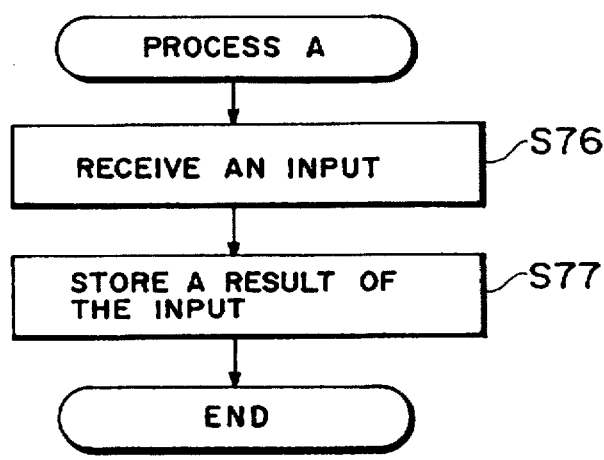

In the process A, a voluntary multi-media data part is selectively inputted by the user through the input unit 84, as shown in FIG. 28, and the input is received (Step S76). A key data of the selected multi-media data part is temporarily stored in the register 90 through the reproduction processing unit 88.

The process B serves to have the user to recognize that some multi-media data part has been selected in the process A, and to display a name of the selected multi-media data part on a screen of the image display unit 81. More specifically, various information of characters (a sequence of displayed characters, coordinates of the display, a font and a point, and a color of characters) to be displayed is received from the sequence data forming/updating program 86 (Steps S78 through S81). After that, characters showing the name of the multi-media part is displayed on the screen of the image display apparatus 81 through the reproduction processing unit 88 (Step S82).

The process C serves to transfer the key data stored temporarily in the register 90 in the process A to the RAM 89 as sequence data (transfer a result of an input; Step S83). The data transferred to the RAM 89 becomes an order information used when the sequence data reproducing program 87 reproduces the voluntary multi-media title. This is sequence data, and its file is the sequence data file.

Figure 31:
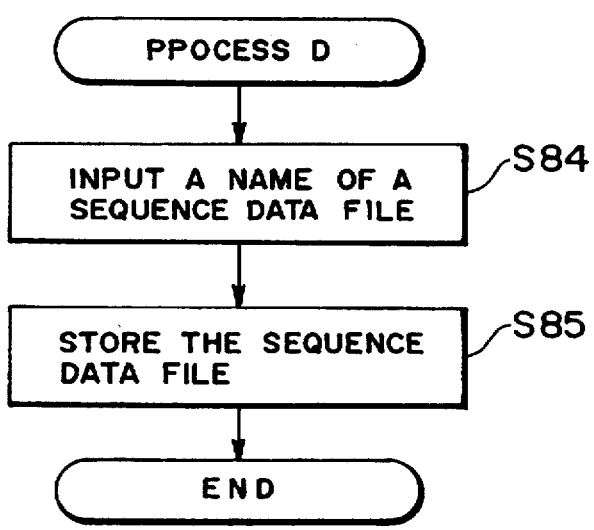

In the process D, the user is prompted to input a name of the sequence data file formed this time, as shown in FIG. 31. When the name of the sequence data file is inputted through the input unit 84 (Step S84), the sequence data file on the RAM 89 is transferred along with its file name to the sequence data storing unit 91 through the reproduction processing unit 88 and stored therein (Step S85).

When an execution of the sequence data forming/updating program 86 is terminated as in the above manner, the user can voluntarily carry out the sequence data reproducing program 87. The sequence reproducing program 87 develops as shown in FIG. 32.

More specifically, plural sequence data files stored in the sequence data storing apparatus 91 are searched, and the user is prompted to select a voluntary sequence data file.

When a sequence data file is selected (Step S86), the selected sequence data file is read from the sequence data storing apparatus 91 into the RAM 89 (Step S87), then a corresponding multi-media data part is searched in the database 83 on the basis of the key data in the sequence data file (Step S88).

The searched data is read into the RAM 89 through the reproduction processing unit 88 (Step S89), and its image data and sound data are reproduced on the image display apparatus 81 and the sound reproducing apparatus 82 (Step S90).

The process at Steps S88 through S90 is performed on all key data in one sequence data file. When the process for key data file finishes (YES judgement at Step S91), a process by the sequence data reproducing program 87 is terminated.

An operation of the above-mentioned apparatus of the third embodiment will be next described more concretely with reference to FIG. 33. A multi-media title shown in FIG. 33 is so formed as to be installed on a counter for attending to customers of a travel agency. With this multi-media title, the customer can voluntarily select a city to visit, an airline to get on, and the sights to visit, and multi-media information commenting these information can be reproduced and displayed. Incidentally, a progress of the multi-media title shown in FIG. 33 is based on a flowchart showing in FIGS. 26 through 32.

When the multi-media title of this embodiment is started, a screen as shown in FIG. 33(a) is displayed on an image display apparatus 81. In the title of this, two kinds of menu, "CREATE (execute a production updating program)" and "PLAY (execute a reproducing program)", are displayed. Here, "CREATE" is first selected so as to execute a sequence data forming/updating program 86.

According to selection of "CREATE", images and sounds are outputted, a program is reproduced, and a screen for selecting a city to visit is displayed as shown in FIG. 33(b). On this occasion, if the user designates a certain point on the screen, the user can watch and listen a list of features (main sights, spots worthy of a visit, etc.) as the multi-media information, which becomes a reference when the user decides a city to visit. When the user selects a city to visit, a process A shown in FIG. 28 is executed, and a result of the input is temporarily stored in the register 90. In FIG. 33(b), there is selected Paris as a city to visit.

Figure 29:
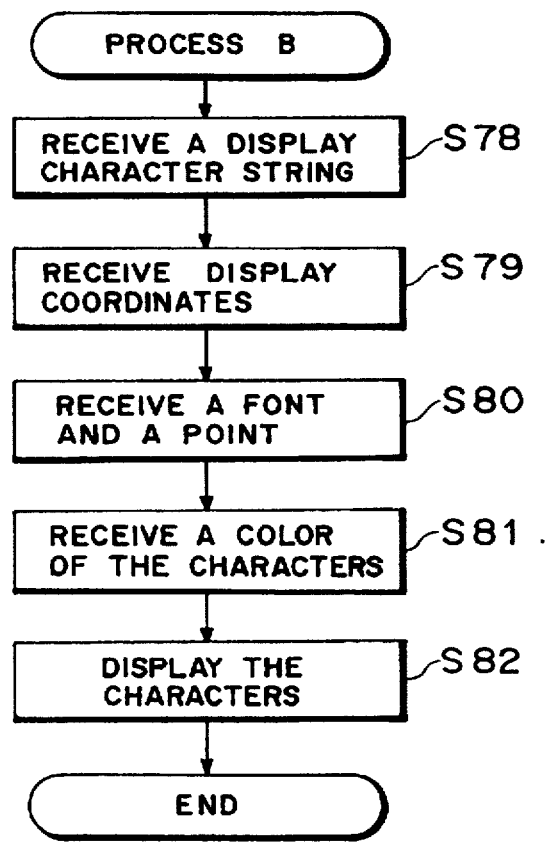
Figure 30:
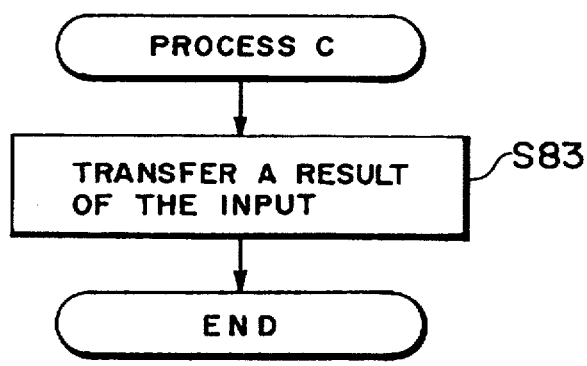

When the user selects a city to visit, a process B shown in FIG. 29 and a process C shown in FIG. 30 are executed. A result of the input is displayed on the screen as shown in FIG. 33(c), besides the result of the input is transferred to the RAM 89 as sequence data.

Next, a screen for selecting an airline to be used is displayed as shown in FIG. 33(d). When the user designates a certain point on the screen, the user can watch and listen a list of features (a fare, menus of meals, special services, etc.) as the multi-media information, which becomes a reference when the user decides an airline. When the user selects an airline, the process A is executed as well as the above, and a result of the input is temporarily stored in the register 90. Incidentally, there is selected Japan Airline in FIG. 33(d).

When the user selects an airline, the process B and the process C are executed, a result of the input is displayed on the screen, besides the result of the input is transferred as a sequence to the RAM 89 in the same manner.

Next, a screen for selecting the sights to which the user wants to visit is displayed as shown in FIG. 33(f). When the user designates a certain point on the screen, the user can watch and listen the sights(spots worthy of a visit, an expense, time, etc.) as the multi-media information, which becomes a reference when the user decides the sights to visit. When the user selects the sights to visit, the process A is executed as well as the above, and a result of an input is temporarily stored in the register 90. Incidentally, there is selected an Eiffel Tower in FIG. 33(f). When the user selects the sights, the process B and the process C are executed. As shown in FIG. 33(g), a result of the input is displayed on the screen, besides the result of the input is transferred as a sequence to the RAM 89.

When the user finishes selection of all items as in the above manner, the process D shown in FIG. 31 is executed, and a screen for inputting a file name of the produced sequence data is displayed as shown in FIG. 33(h). When the user inputs a desiring file name and selects "RETAIN", the sequence data file retained in the RAM 89 is transferred to the sequence data storing apparatus 91 as a sequence data file having that file name and stored therein.

When execution of the production updating program 86 is terminated, a condition of the display on the image display apparatus 81 returns to the initial selection menu screen as shown in FIG. 33(i). On this screen, the user selects "PLAY" to execute the sequence data reproducing program 87.

Figure 32:
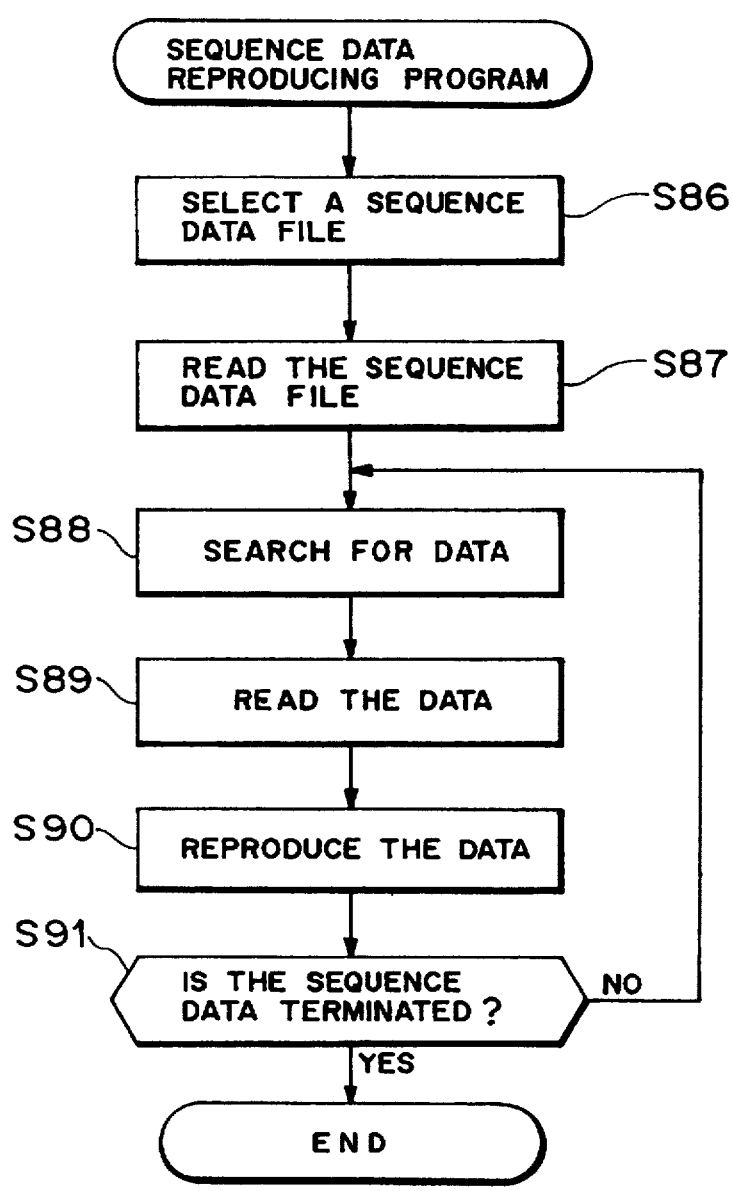

On this occasion, a process shown in FIG. 32 is executed, and all sequence data file names (indicated by an extension .SQC, as an instance, here) in the sequence data storing apparatus 91 are searched and displayed as shown in FIG. 33(j). The user selects a voluntary sequence data on the display. The selected sequence data file is read from the sequence data storing apparatus 91 out to the RAM 89.

The multi-media title is then reproduced on the basis of the sequence data read into the RAM 89. In this example, a multi-media part illustrating the sights in Paris, a multi-media part illustrating services provided by Japan Airline, and a multi-media part illustrating Eiffel Tower are successively reproduced and outputted through the image display apparatus 81 and the sound reproducing apparatus 82.

As above, the user can watch and listen efficiently only the multi-media information that the user has voluntarily selected.

According to the third embodiment of this invention, the user who know nothing about a manner to form the multi-media title can combine voluntary multi-media parts and form a secondary multi-media title without being aware of the program so as to watch and listen only necessary information efficiently.

It is possible to store a sequence data made up of key codes in a portable small-capacity storage medium and exchange data readily. For this, the multi-media title becomes more familiar and convenient to the user and a multi-media information reproduction apparatus can be spread widely.

The third embodiment has been described by way of an example of a multi-media title made for the purpose of installing it on a counter for attending customers in a travel agency. This invention is not limited to the above example, but applicable to a case where various multi-media information is reproduced. In any case, the present invention may bring the same functions and effects.

What is claimed is:

1. An operation guidance information reproducing method when an event requiring measures to be taken by an operator occurs in an object apparatus, comprising the steps of:

storing in advance in a database measures information parts, which are obtained by deassembling operation guidance information for the measures to be taken by the operator into parts, each of which is a minimum unit of the measures which may be taken for said object apparatus by the operator reading the measures information parts from the database depending on the event;

determining an order for reproducing the measures information parts to avoid duplicates of the measures information parts, depending on the event; and successively reproducing the measures information parts in said order of reproduction, notifying the operator of the operation guidance information depending on the event.

2. The operation guidance information reproducing method according to claim 1, wherein an image obtained by visualizing one of the measures to be taken by the operator from a viewpoint of the operator looking at the object apparatus is displayed as said operation guidance information on a predetermined display unit.

3. The operation guidance information reproducing method according to claim 2, wherein character information explaining the one of the measures is displayed on said display unit as said operation guidance information along with said image.

4. The operation guidance information reproducing method according to claim 2, wherein sound information explaining the one of the measures is outputted simultaneously when said image is displayed on said display unit.

5. The operation guidance information reproducing method according to claim 3, wherein sound information explaining the one of the measures is outputted simultaneously when said image is displayed on said display unit.

6. The operation guidance information reproducing method according to claim 1, wherein said operation guidance information is reproduced at a terminal apparatus connected to said object apparatus to manage said object apparatus.

7. The operation guidance information reproducing method according to claim 6, wherein said database is provided on a side of an upper apparatus connected to said terminal apparatus to manage said terminal apparatus and is used commonly by another terminal apparatus.

8. An operation guidance information reproducing apparatus comprising:

- a reproduction control unit for reading operation guidance information from a database depending on an event, when the event requiring measures to be taken by an operator occurs in an object apparatus, to control reproduction of said operation guidance information;
- a reproducing unit controlled by said reproduction control unit for reproducing said operation guidance information to notify the operator of said operation guidance information, said operation guidance information including measures information parts each of which is a minimum unit of measures to be taken for said object apparatus by the operator, said operation guidance information being stored in advance in said database;
- a searching unit for searching the measures information parts depending on the event in said database; and
- an order determining unit for determining an order for reproducing said measures information parts searched by said searching unit to avoid duplication of the same measures parts;
- said reproducing control unit controlling successive reproduction of said measures information parts from said database in the order of reproduction determined by said order determining unit at said reproducing unit.

9. The operation guidance information reproducing apparatus according to claim 8 further comprising a display unit as said reproducing unit for reproducing and displaying said operation guidance information as an image the image being obtained by visualizing one of the measures from a viewpoint of the operator looking at said object apparatus.

10. The operation guidance information reproducing apparatus according to claim 9, wherein character information explaining the one of the measures is reproduced and displayed on said display unit as said operation guidance information along with said image.

11. The operation guidance information reproducing apparatus according to claim 9 further comprising a sound outputting unit as said reproducing unit for reproducing and outputting said operation guidance information as sound information, explaining the one of the measures, reproduced and outputted from said sound outputting unit simultaneously when said image is reproduced and displayed on said display unit.

12. The operation guidance information reproducing apparatus according to claim 10 further comprising a sound outputting unit as said reproducing unit for reproducing and outputting said operation guidance information as sound information, explaining the one of the measures, reproduced and outputted from said sound outputting unit simultaneously when said image is reproduced and displayed on said display unit.

13. The operation guidance information reproducing apparatus according to claim 8, wherein said database is provided on a side of an upper apparatus and is used commonly by another apparatus.

\* \* \* \* \*